(12) United States Patent
Jaber

(10) Patent No.: US 6,792,441 B2
(45) Date of Patent: Sep. 14, 2004

(54) PARALLEL MULTIPROCESSING FOR THE FAST FOURIER TRANSFORM WITH PIPELINE ARCHITECTURE

(75) Inventor: Marwan A Jaber, North-Montreal (CA)

(73) Assignee: Jaber Associates LLC, Montreal (CA)

(*) Notice: Subject to any disclaimer, the term of this patent is extended or adjusted under 35 U.S.C. 154(b) by 365 days.

(21) Appl. No.: 09/803,374

(22) Filed: Mar. 10, 2001

(65) Prior Publication Data

US 2001/0051967 A1 Dec. 13, 2001

Related U.S. Application Data

(60) Provisional application No. 60/188,412, filed on Mar. 10, 2000.

(51) Int. Cl.[7] .............................................. G06F 17/14
(52) U.S. Cl. ........................ 708/403; 708/406; 708/409
(58) Field of Search .................................. 708/403–405

(56) References Cited

PUBLICATIONS

Aiken et al "A Parallel Pipelined DSP Processor Core" IEEE papers 81–84, 1997.*

* cited by examiner

*Primary Examiner*—Tan V. Mai
(74) *Attorney, Agent, or Firm*—Allan Jacobson

(57) ABSTRACT

The discrete Fourier transform (DFT) is computed in a plurality of parallel processors. A DFT of length N is divided into r partial DFTs of length (N/r), in which the r partial DFTs are calculated in separate parallel processors and then combined in a combination phase to form a complete DFT of length (N). The r partial FFTs are able to be computed in parallel multiprocessors by defining the mathematical model of the combination phase in such manner so as to allow the r parallel processors to operate independently and simultaneously. A second embodiment presents a radix-r fast Fourier algorithm that reduces the computational effort as measured by the number of multiplications and permits the N/r parallel processors to operate simultaneously and with a single instruction sequence.

4 Claims, 12 Drawing Sheets

8 POINTS DFT

8 POINTS DFT OBTAINED BY COMBINING TWO FOUR POINTS DFT

8 POINTS DFT OBTAINED BY COMBINING FOUR TWO POINTS DFT

FIG. 2A1
(PRIOR ART)
DIT RADIX-2 BUTTERFLY COMPUTATION
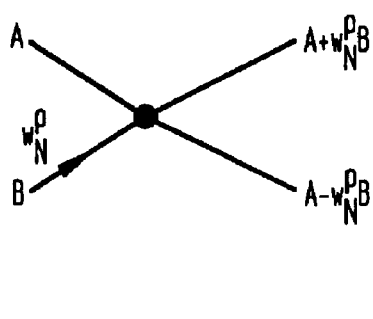
FIG. 2A2
(PRIOR ART)
DIF RADIX-2 BUTTERFLY COMPUTATION
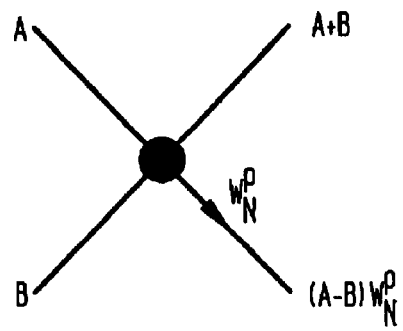
FIG. 2B
(PRIOR ART)
BUTTERFLIES REPRESENTATION OF AN 8 POINTS FFT
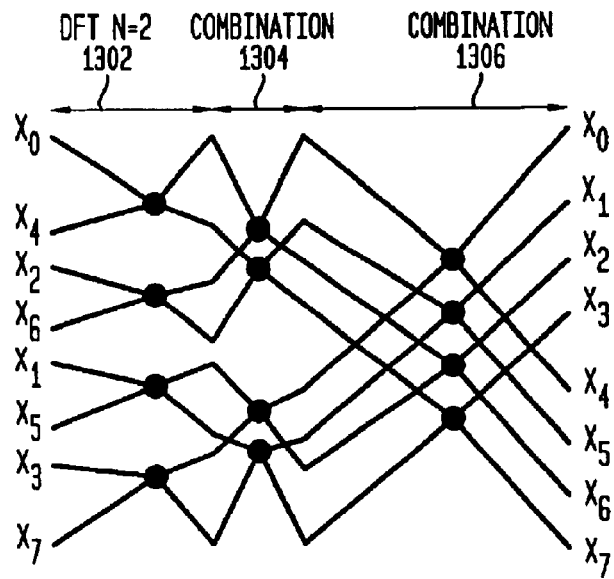

IN PLACE FFT WITH BIT REVERSED INPUTS AND NORMALLY ORDERED OUTPUTS (r=2)

IN PLACE FFT WITH BIT REVERSED INPUTS AND NORMALLY ORDERED OUTPUTS

JABER'S RADIX-r DIF ENGINE

SIMPLIFIED JABER'S RADIX-r DIF ENGINE

JABER'S RADIX-r DIT ENGINE

SIMPLIFIED JABER'S RADIX-r DIT ENGINE

JABER'S RADIX-r DIF MODULE

JABER'S RADIX-r DIT MODULE

RADIX-8 DIT FFT ENGINE

RADIX-16 DIF FFT ENGINE

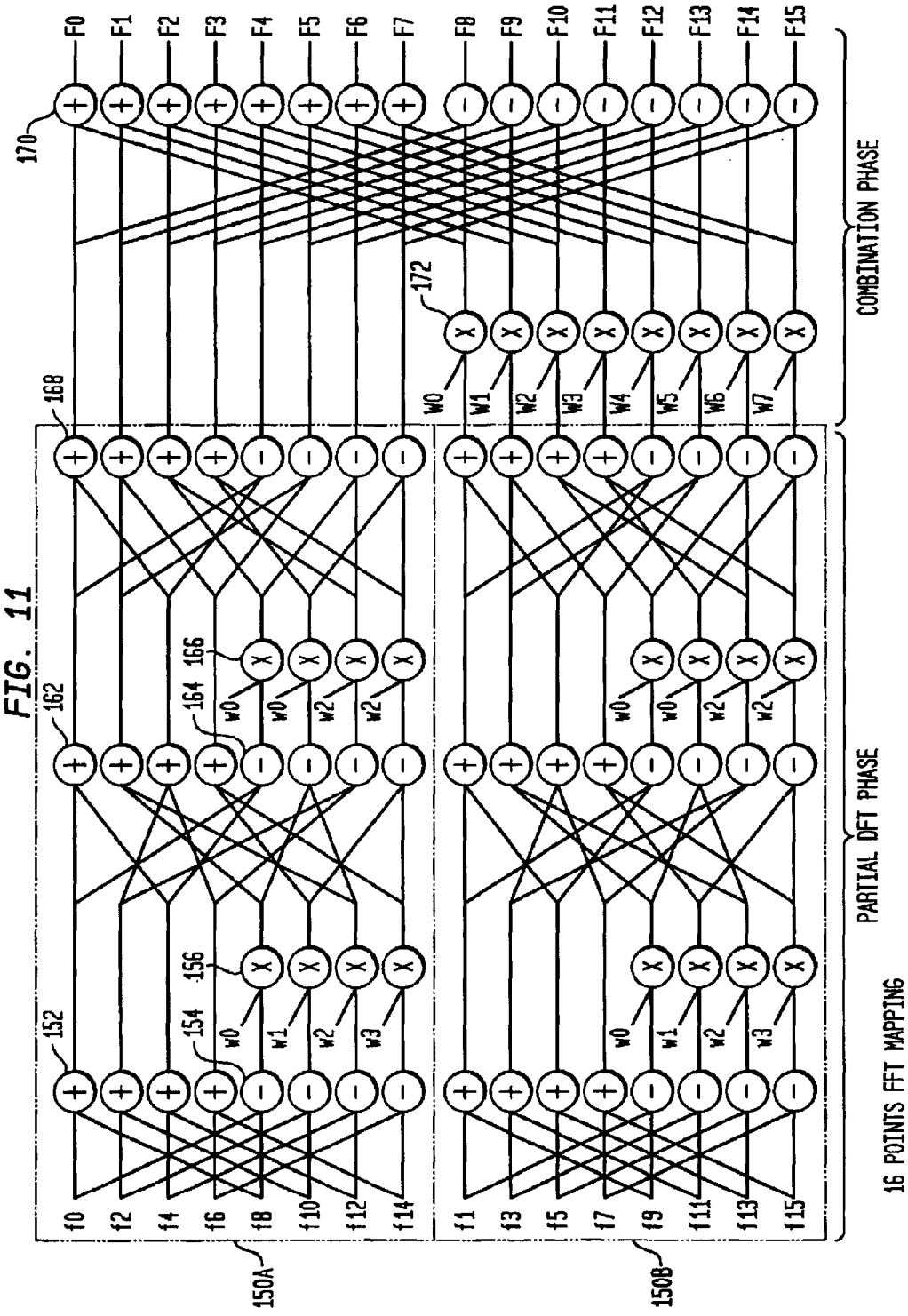

US 6,792,441 B2

PARALLEL MULTIPROCESSING FOR THE FAST FOURIER TRANSFORM WITH PIPELINE ARCHITECTURE

This application claims the benefit of Provisional Application No. 60/188,412, filed Mar. 10, 2000.

FIELD OF INVENTION

The present invention relates to the field of Fast Fourier Transform analysis. In particular, the present invention relates to a parallel processing architecture adapted for use in a pipelined Fast Fourier Transform method and apparatus.

BACKGROUND OF THE INVENTION

Physical parameters such as light, sound, temperature, velocity and the like are converted to electrical signals by sensors. An electrical signal may be represented in the time domain as a variable that changes with time. Alternatively, a signal may be represented in the frequency domain as energy at specific frequencies. In the time domain, a sampled data digital signal is a series of data points corresponding to the original physical parameter. In the frequency domain, a sampled data digital signal is represented in the form of a plurality of discrete frequency components such as sine waves. A sampled data signal is transformed from the time domain to the frequency domain by the use of the Discrete Fourier Transform (DFT). Conversely, a sampled data signal is transformed back from the frequency domain into the time domain by the use of the Inverse Discrete Fourier Transform (IDFT).

The Discrete Fourier Transform is a fundamental digital signal-processing transformation used in many applications. Frequency analysis provides spectral information about signals that are further examined or used in further processing. The DFT and IDFT permit a signal to be processed in the frequency domain. For example, frequency domain processing allows for the efficient computation of the convolution integral useful in linear filtering and for signal correlation analysis. Since the direct computation of the DFT requires a large number of arithmetic operations, the direct computation of the DFT is typically not used in real time applications.

Over the past few decades, a group of algorithms collectively known as Fast Fourier Transform (FFT) have found use in diverse applications, such as digital filtering, audio processing and spectral analysis for speech recognition. The FFT reduces the computational burden so that it may be used for real-time signal processing. In addition, the fields of applications for FFT analysis are continually expanding.

Computational Burden

Computation burden is a measure of the number of calculations required by an algorithm. The DFT process starts with a number of input data points and computes a number of output data points. For example, an 8-point DFT may have an 8-point output. See FIG. 1A. The DFT function is a sum of products, i.e., multiplications to form product terms followed by the addition of product terms to accumulate a sum of products (multiply-accumulate, or MAC operations). See equation (1) below. The direct computation of the DFT requires a large number of such multiply-accumulate mathematical operations, especially as the number of input points is made larger. Multiplications by the twiddle factors $w_N^r$ dominate the arithmetic workload.

To reduce the computational burden imposed by the computationally intensive DFT, previous researchers developed the Fast Fourier Transform (FFT) algorithms in which the number of required mathematical operations is reduced. In one class of FFT methods, the computational burden is reduced based on the divide-and-conquer approach. The principle of the divide-and-conquer approach method is that a large problem is divided into smaller sub-problems that are easier to solve. In the FFT case, the division into sub-problems means that the input data are divided in subsets for which the DFT is computed to form partial DFTs. Then the DFT of the initial data is reconstructed from the partial DFTs. See N. W. Cooley and J. W. Tukey, "An algorithm for machine calculation of complex Fourier series", Math. Comput., Vol. 19 pp. 297–301, April 1965. There are two approaches to dividing (also called decimating) the larger calculation task into smaller calculation sub-tasks: decimation in frequency (DIF) and decimation in time (DIT).

Butterfly Implementation of the DFT

For example, an 8-point DFT can be divided into four 2-point partial DFTs. The basic 2-point partial DFT is calculated in a computational element called a radix-2 DIT butterfly (or butterfly-computing element) as represented in FIG. 2A1. Similarly to the DIT butterfly-computing element, FIG. 2A2 shows the function of a radix-2 DIF butterfly. A radix-2 butterfly has 2 inputs and 2 outputs, and computes a 2-point DFT. FIG. 2B shows an FFT using 12 radix-2 butterflies to compute an 8-point DFT. Butterfly-computing elements are arranged in stages. There are three stages 1302, 1304 and 1306 of butterfly calculation. Data, $x_n$ is fed to the input of the butterfly-computing elements in the first stage 1302. After the first stage 1302 of butterfly-computation is complete, the result is fed to the in input of the next stage(s) of butterfly-computing element(s) and so on.

In particular, four radix-2 butterflies operate in parallel in the first stage 1302 to compute 8 partial DFTs. The 8 outputs of the first stage 1302 are combined in 2 additional stages 1304, 1306 to form a complete 8-point DFT output, $X_n$. Specifically, the second stage 1304 of 4 radix-2 butterflies and the third stage 1306 of 4 radix-2 butterflies comprise a two stage combination phase in which 8 radix-2 butterflies responsive to 8 partial DFTs form the final 8-point DFT function, $X_n$.

FIG. 2C shows an FFT using 32 radix-2 butterflies to compute a 16-point DFT. There are 4 stages of butterfly calculation. Eight radix-2 butterflies operate in parallel in the first stage 1402 where 2-point partial DFTs are calculated. The outputs of the first stage are combined in 3 additional combination stages 1403, 1404 and 1406 to form a complete 16-point DFT output. The output of the second stage 1403 of 8 radix-2 butterflies is coupled to a third stage 1404 of 8 radix-2 butterflies. The output of the third stage 1404 of 8 radix-2 butterflies is coupled to a fourth stage 1406 of 8 radix-2 butterflies, the output of which the final 16-point DFT function. The combination phases 1403, 1404, 1406 comprise a combination phase in which 24 radix-2 butterflies responsive to 16 partial DFTs (from the first phase 1402) form the final 16 point DFT function, $X_n$.

Higher order butterflies may be used. See FIG. 2D, which uses 8 radix-4 butterflies in 2 stages 1502, 1502 to compute a 16-point DFT. In general, a radix-r butterfly is a computing element that has r input points and calculates a partial DFT of r output points. In FIG. 2D, four radix-4 butterflies compute 16 partial DFTs in a first stage 1502. The combination phase 1504 comprises four radix-4 butterflies responsive to 16 partial DFTs (from the first phase 1502) to form the final 16 point DFT function, $X_n$.

Communication Burden

A computational problem involving a large number of calculations may be performed one calculation at a time by using a single computing element. While such a solution uses a minimum of hardware, the time required to complete the calculation may be excessive. To speed up the calculation, a number of computing elements may be used in parallel to perform all or some of the calculations simultaneously. A massively parallel computation will tend to require an excessively large number of parallel-computing elements. Even so, parallel computation is limited by the communication burden. For example, a large number of data and constants may have to be retrieved from memory over a finite capacity data bus. In addition, intermediate results in one parallel-computing element may have to be communicated to another parallel-computing element. The communication burden of an algorithm is a measure of the amount of data that must be moved, and the number of calculations that must be performed in sequence (i.e., that cannot be performed in parallel).

In particular, in a butterfly implementation of the DFT, some of the butterfly calculations cannot be performed simultaneously, i.e., in parallel. Subsequent stages of butterflies cannot begin calculations until earlier stages of butterflies have completed prior calculations. Also, the connections between butterflies in each stage to butterflies in the other stages impose a heavy communication burden between the butterfly computation stages. Thus, parallel implementations of the butterfly DFT are hampered by a heavy communication burden between butterflies.

SUMMARY OF THE INVENTION

The heavy communication burden between the butterfly stages in the prior art results from structuring the butterfly implementation such that the first butterfly stage computes partial DFTs over the input data, and the latter butterfly stages combine the partial DFTs. In accordance with the present invention, partial DFTs are computed in a plurality of separate parallel processors and then combined in a single stage of combination for the parallel processing algorithm. Also, in accordance with the present invention for the multi-stage parallel processing algorithm, partial DFTs are computed in a plurality of separate parallel circuit boards that contain plurality of separate parallel chips, which contain plurality of separate parallel processors. The output data is obtained by combining firstly the outputs of the plurality of separate parallel processors, secondly by combining the outputs of the plurality of separate parallel chips and finally by combining the plurality of the outputs of the separate parallel circuit boards.

The present architecture is a reorganization of the butterfly calculation of the DFT so as to reduce the communication burden between butterflies implemented in parallel computing elements. In particular, no communication is required between pluralities of separate parallel processors, chips or circuit boards. A combination stage of butterfly calculation is provided which combines the outputs of all the parallel processors (chips or circuit boards).

In accordance with the present invention, the input data points of an N point DFT are divided into subsets of data. A plurality of processors, chips or circuit boards operate in parallel and independently of each other, and each being responsive to each respective subset of the input data points. The partial DFTs at the output of the plurality of parallel processors in each chip are then combined in a single combination phase to provide the complete partial DFT for a single chip. The partial DFTs at the output of the plurality of parallel chips in each circuit board are then combined in a single combination phase to provide the complete partial DFT for a single board. The partial DFTs at the output of the plurality of parallel circuit boards are then combined in a single combination phase to provide the DFT solution.

In the general case, each output data point of the DFT is a function of all of the input data points. However, by dividing the input data set into subsets, and operating each parallel processor independently of the other parallel processors in accordance with the present invention, the communication between the parallel processors is eliminated, thereby reducing the communication burden. Each or several parallel processors may then be implemented on a separate semiconductor chip or circuit board, without requiring any communication with any of the other parallel processors.

In a second embodiment of the present invention, a radix-r butterfly implementation is provided in which the plurality of independent processors are operated in parallel using the same instructions and accessing the same necessary set of multiplier coefficients from memory at the same time. The resulting algorithm, in which a number of parallel processors operate simultaneously by a single instruction sequence, reduces both the computational burden and the communication burden.

BRIEF DESCRIPTION OF THE DRAWINGS

FIG. 2A1 is a schematic representation of a DIT radix-2 butterfly computation.

FIG. 2A2 is a schematic representation of a DIF radix-2 butterfly computation.

FIG. 2B is a signal flow graph illustrating an FFT calculation using 12 radix-2 butterflies to compute an 8-point FFT in three stages.

FIG. 11 is a block diagram of a 16-point radix-2 embodiment of a parallel FFT multiprocessor in accordance with the present invention using two 8-point parallel processors.

DETAILED DESCRIPTION

Figure 1A:
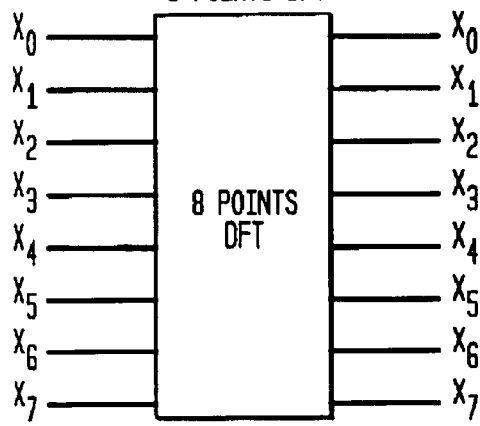
FIG. 1A is a block diagram representation of an 8-point DFT function.
Figure 1B:
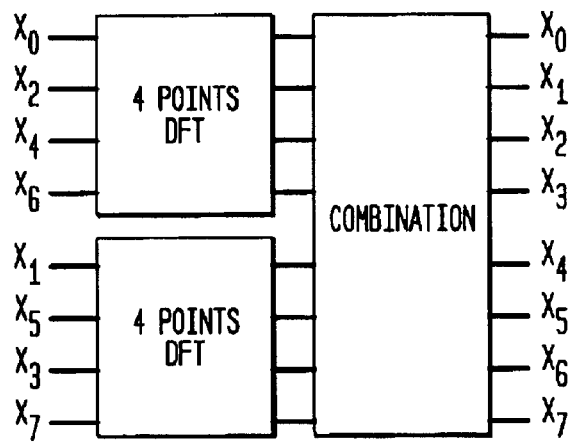
FIG. 1B is a block diagram representation of an 8-point DFT obtained by combining two 4-point DFTs.
Figure 1C:
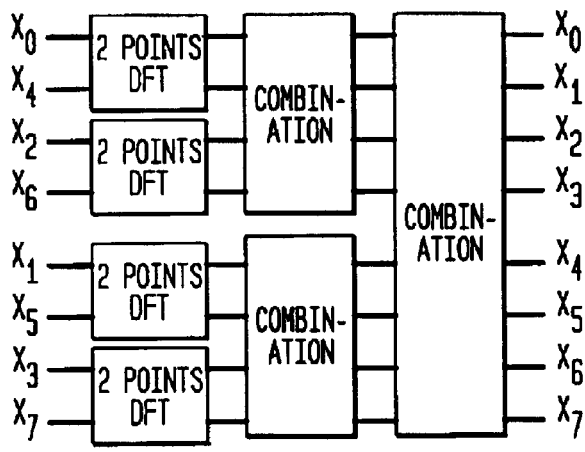
FIG. 1C is a block diagram representation of an 8-point DFT obtained by combining four 2-point DFTs.

The definition of the DFT is shown in equation (1), $x_{(n)}$ is the input sequence, $X_{(k)}$ is the output sequence, N is the transform length and $w_N$ is the $N^{th}$ root of unity ($w_N = e^{-j2\pi/N}$). Both $x_{(n)}$ and $X_{(k)}$ are complex valued number sequences.

$$X_{(k)} = \sum_{n=0}^{n=N-1} x_{(n)} w_N^{nk}, k \in [0, N-1]. \quad (1)$$

From equation (1) it can be seen that the computational complexity of the DFT increases as the square of the transform length, and thus, becomes expensive for large N. A class of FFT methods, known as fast algorithms for DFT computation, is based on the divide-and-conquer approach. The principle of the divide-and-conquer approach method is that a large problem is divided into smaller sub-problems that are easier to solve. In the FFT case, the division into sub-problems means that the input data $x_n$ are divided in subsets on which the DFT is computed. Then the DFT of the initial data is reconstructed from these intermediate results. If this strategy is applied recursively to the intermediate DFTs, an FFT algorithm is obtained. Some of these methods are the Common Factor Algorithm, the Split-Radix Algorithm, the Prime Factor Algorithm and the Winograd Fourier Transform Algorithm (WFTA). Of particular interest is the in place (or butterfly) computation.

The main objective of many FFT algorithms is a reduction in computation and particularly the reduction in the amount of multiplication.

Parallel Processing: Dividing the Input Data Into Subsets

The communication burden is best addressed at the architecture level where the representation of the DFT in terms of its partial DFTs is restructured mathematically. The problem resides in finding a mathematical model of the combination phase. The problem is to find a way that $X = T_N \times$ (a vector with n components) can be recovered from r vectors that are r times shorter. The first step is to divide x itself. The vector $S = (x_0, x_1, \ldots, x_{n-1})$ is split into r shorter pieces and the subdivision continues in till we obtain subsets in each of which we could find a single vector of length r. For the first subdivision, the original set $S_0$ (level or layer 0) is subdivided into r subsets:

$$S_{10} = x_m, S_{11} = x_{(m+1)}, \ldots, \text{ and } S_{1(r-1)} = x_{(m+(r-1))} \quad (4).$$

The subsets of level or layer 1 could be expressed as:

$$S_{1j_1} = x_{(r^1 n + j_1)} \quad (5),$$

for $j_1 = 0, 1, \ldots, r-1$ and $n = 0, 1, \ldots, ((N/r)-1)$. Each piece of these subsets are divided into r subsets of length $(N/r^2-1)$, therefore, each of the subsets $S_{10}, S_{11}, \ldots, S_{1(r-1)}$ is subdivided into r subsets yielding to:
the subset of $S_{10}$ will include:

$$S_{200} = x_{r(rn)}, S_{210} = x_{r(rn+1)}, \ldots, S_{2(r-1)0} = x_{r(rn+(r-1))}) \quad (6),$$

$S_{11}$ would have on level (layer) 2

$$S_{201} = x_{r(rn)+1}, S_{211} = x_{r(rn+1)+1}, \ldots, S_{2(r-1)1} = x_{r(rn+(r-1))+1} \quad (7),$$

and finally $S_{1(r-1)}$ on level (layer) 2 will contain:

$$S_{20(r-1)} = x_{r(rn)+(r-1)}, S_{21(r-1)} = x_{r(rn+1)+(r-1)}, \ldots, S_{2(r-1)(r-1)} = x_{r(rn+(r-1))+(r-1)}) \quad (8).$$

The second subdivision could be represented by:

$$S_{2j_1j_2} x_{(r(rn+j_2)+j_1)} = x_{(r^2 n + r^1 j_2 + r^0 j_1)} \quad (9),$$

for $j_1 = j_2 = 0, 1, \ldots, r-1$, and $n = 0, 1, \ldots, ((N/r^2)-1)$.
In general, the subsets of the $i^{th}$ level (layer) could be obtained by:

$$S_{ij_1 \ldots j_i} = x_{(r^i n + r^{(i-1)} j_i + r^{i-2} j_{i-1} + \ldots + r^0 j_1)} \quad (10),$$

for $i = 1, \ldots, p$, $j_i = j_{i-1} = \ldots = 0, 1, \ldots, r-1$, $p = (\log_r(N)/\log_r)-1$, and $n = 0, 1, \ldots, ((N/r^i)-1)$.

In each subdivided subsets, the coefficients just go alternately into r vectors of length r, $x_0$, $x_1$, and $x_{(r-1)}$ known as the radix r core calculation (or kernel computation). Then from those vectors we form $$X_0 = T_r x_0, X_1 = T_r x_1, \ldots, \text{ and } X_{(r-1)} = T_r x_{(r-1)} \quad (11).$$

Figure 7:
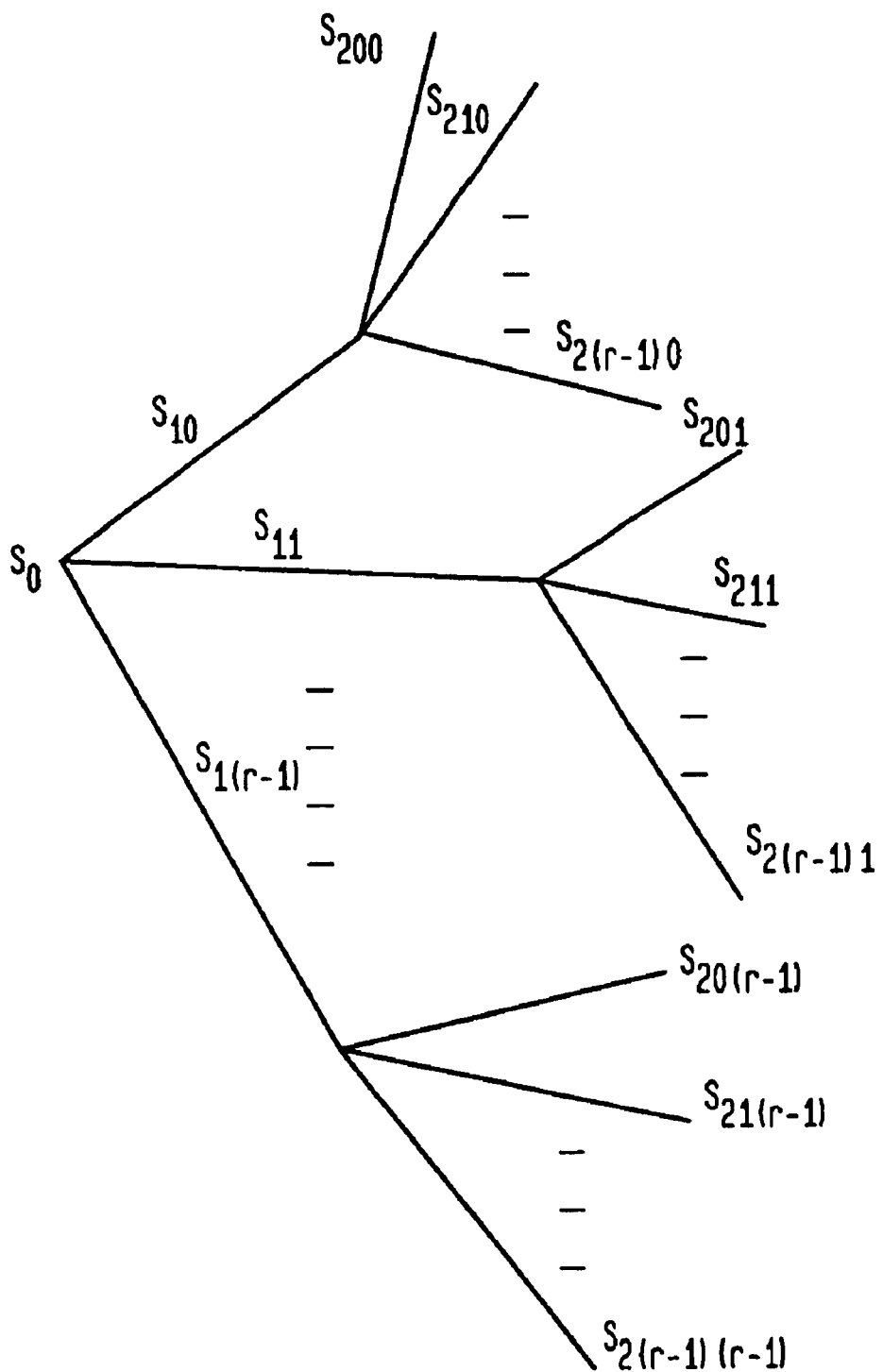
FIG. 7 illustrates the design methodology for dividing sets of input data into subsets for use in conjunction with the present invention.
Figure 8:
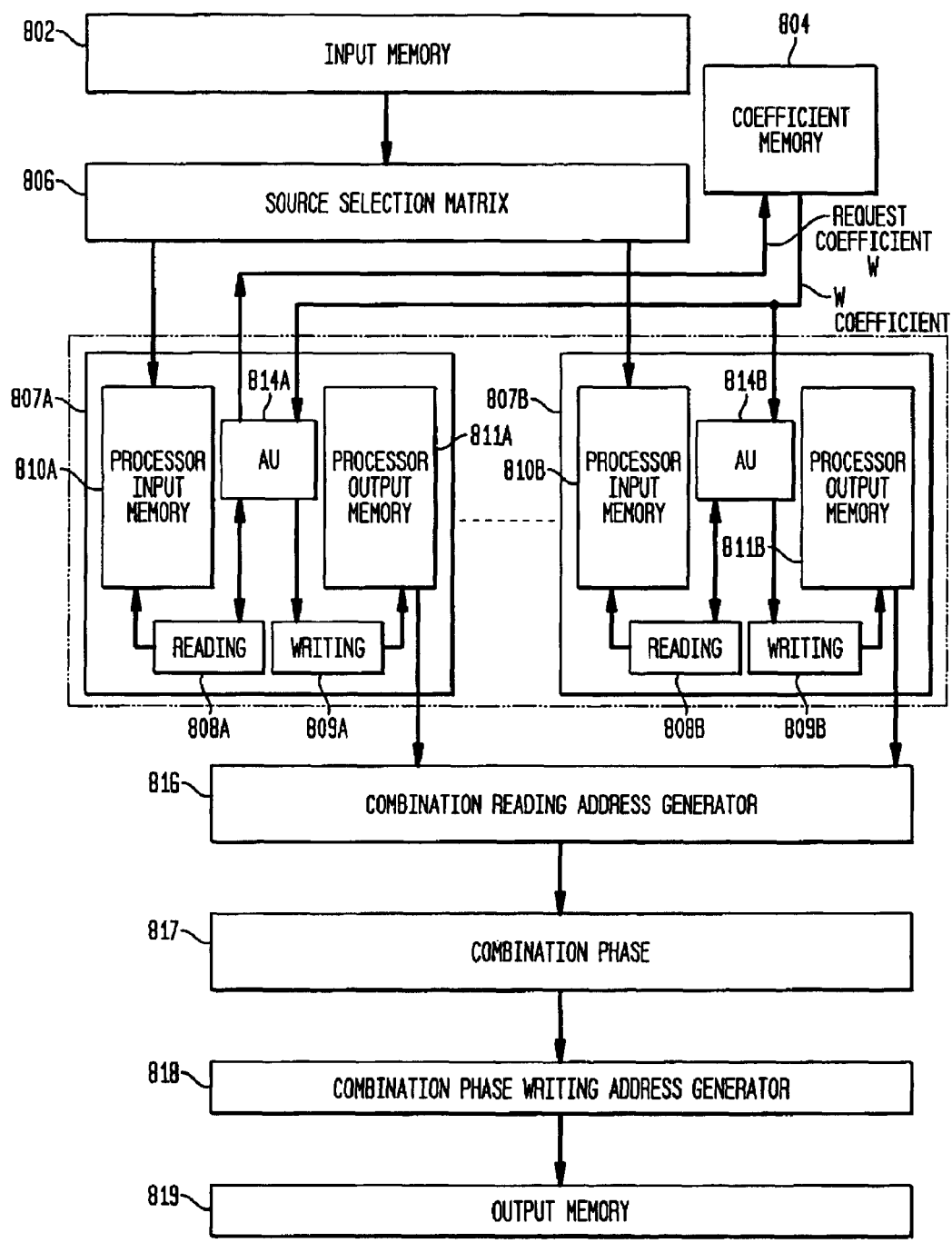
FIG. 8 is a block diagram of a parallel FFT multiprocessor in accordance with the present invention.
Figure 9:
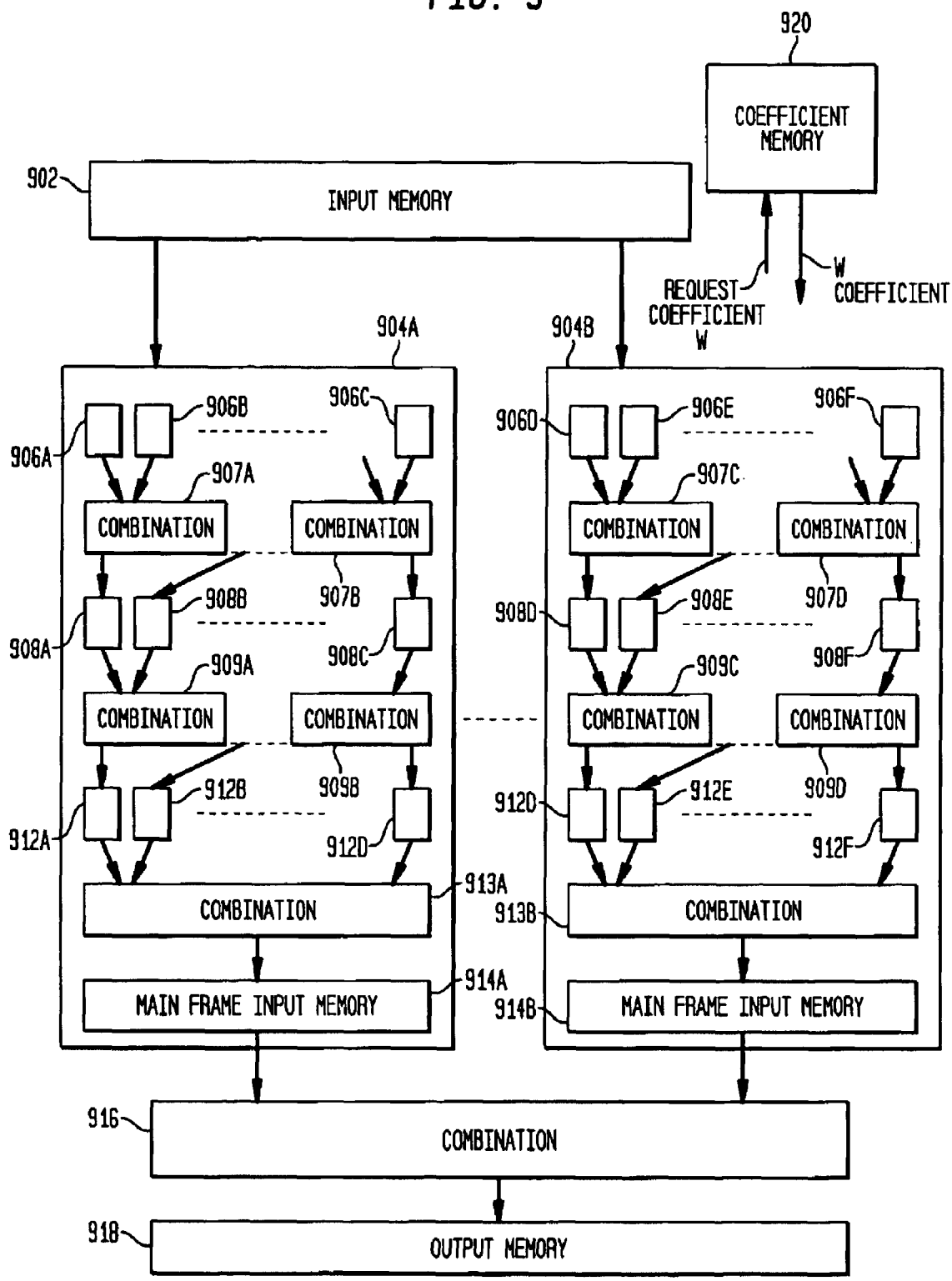
FIG. 9 is a block diagram of a generalized alternate embodiment of a parallel FFT multiprocessor in accordance with the present invention.

Those are the r multiplications by the smaller matrix $T_r$. As in the replacement of $T_N$ by $T_r$, the work has been cut by a factor of r. The central problem is to recover X from the (N/r) points vectors $X_0, X_1, \ldots, X_{(r-1)}$ and Cooley and Tukey noticed how it could be done for radix-2 by introducing the concept of the butterfly computation. Mathematically speaking, the successive subdivisions of the initial data act as if the one-dimensional transform is expressed by a true $r^i$-dimensional transform. FIGS. 7, 8 and 9 illustrate the division of the input data set into subsets.

Parallel Processing: Finding the Mathematical Model for the Combination Phase

Figure 2C:
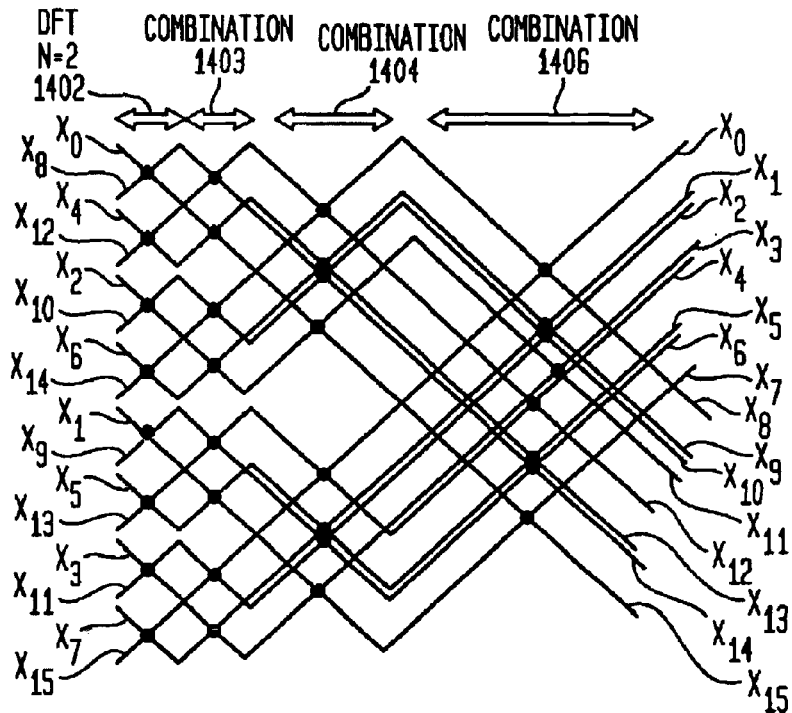
FIG. 2C is a signal flow graph illustrating an FFT calculation using 32 radix-2 butterflies to compute a 16-point FFT in 4 stages.
Figure 2D:
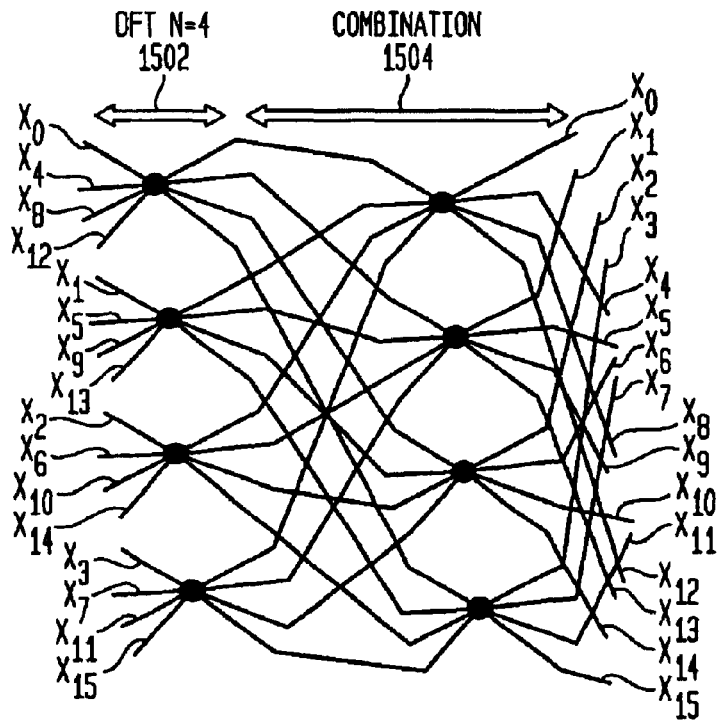
FIG. 2D is a signal flow graph illustrating an FFT calculation using 8 radix-4 butterflies to compute a 16-point FFT in two stages.

Although there is a substantial gain obtained by decomposing the input data into radix r core calculations, as shown in FIGS. 2C and 2D, a severe problem arises in the complexity of the communication load. For higher radices, the communication load will increase drastically with the increasing amount of data. However, the combination phases (where partial DFTs are combined) have certain regularity in their structures. The combination of r vectors in each subdivided subset of length $\beta(\beta = N/r^i)$ is obtained by feeding words of length r into the input of the PE. The $k^{th}$ word at the $i^{th}$ level (layer) is given by:

$$X_{(k,i)} = (X_{(0,k)}, X_{(1,k)}, \ldots, X_{((r-1), k)}) \quad (2),$$

where $k = 0, \ldots, \beta-1$, $i = 1, \ldots, p$ and $p = (\log_r(N)/\log_r)-1$.

The combined output is a vector of length $r\beta$, in which the $l^{th}$ output of the $k^{th}$ word at the $(i-1)^{th}$ level (layer) is stored into the memory address location $x_l$ according to:

$$X_l = lr\beta + k \quad (3),$$

for $l = 0, 1, \ldots, r-1$.

The advantage of appropriately breaking the DFT in terms of its partial DFTs is that the number of multiplications and the number of stages may be reduced. The number of stages often corresponds to the amount of global communication and/or memory accesses in implementation, and thus, reduction in the number of stages is beneficial. Minimizing the computational complexity may be done at the algorithmic level of the design process, where the minimization of the communication burden is done at the architectural level.

A fast Fourier transform processor implemented using parallel multiprocessing in accordance with the present invention is shown in FIG. 8. An input memory 802 is provided to receive the N input data points. There are r parallel processors 807A through 807B, each responsive to 1/r of the input 802 data points driven by the source selection matrix 806, to compute r partial DFTs. Each of the r parallel processors 807A through 807B are implemented in accordance with equation (17) for DIF or equation (19) for DIT. The outputs of the r parallel processors 807A and 807B are driven to the input of the combination phase 817 by the combination reading address generator 816. After the combination phase 817, the output data is driven to the output memory 819 by the combination writing address generator 818. The combination phase 817 is implemented in accordance with equation (37), given below, for DIT or DIF.

Each parallel processor 807A, 807B, comprises a respective reading address generator 808A, 808B, writing address generator 809A, 809B, input memory 810A, 810B, output memory 811A, 811B and an arithmetic processing unit 814A, 814B.

A coefficient memory 804 is provided to store the coefficients that will be needed during the FFT calculations. In particular, a request for a coefficient is made by any one (or all) of the r arithmetic processing unit 814A through 814B. The coefficients needed by each of the arithmetic processing unit 814A, 814B, and the respective internal butterfly computation units are responsive to the same instructions and use the same coefficients 804.

Note that the r parallel processors 806A through 806B, do not need to communicate with each other. Accordingly, there is no communication burden between the r parallel processors 806A through 806B. Each or several parallel processors may be implemented on a separate chip and several chips could be mounted on a circuit board without the need to send or receive data to or from the other parallel processors, chips or circuit boards.

The parallel multiprocessor architecture of the present invention is further generalized in the block diagram of FIG. 9. An input memory 902 is provided to receive the N input data points. A plurality of parallel processors 906A, 906B, 906C, 906D, 906E, 906F is provided.

Each parallel processor 906A, 906B, 906C, 906D, 906E, 906F includes an arithmetic unit, input and output memories, reading and writing address generators, and each has the same general structure and function as the parallel processor 807A, 807B in the block diagram of FIG. 8. Each parallel processor 906A, 906B, 906C, 906D, 906E, 906F is responsive to a subset of the N input data points. The outputs of the parallel processors 906A, 906B, 906C, 906D, 906E and 906F are combined in respective combination phases 907A, 907B, 907C, 907D. Combination phase 907 is equivalent to the combination phase 817 in FIG. 8 with different parameters. The output of the combination phase 907A, 907B is stored in the input memories of the chips 908A, 908B, 908C, 908D, 908E, 908F (where each chip is an electronic layout forming r parallel processors). The data from the chips 908A, 908B, 908C, 908D, 908E and 908F is combined in combination phases 909A, 909B, 909C, 909D, 909E, 909F and stored in the input memories of the circuit boards 912A, 912B, 912C, 912D, 912E, 912F. A circuit board is an electronic device on which r parallel chips are mounted. The data of the circuit boards 912A, 912B, 912C, 912D, 912E and 912F are combined in combination phases 913A, 913B and stored in the input memories 914A, 914B of the sub frames 904A, 904B (where a sub-frame is an electronic component on which r parallel circuit boards are mounted). The data of the sub frames 904A and 904B, is combined in combination phase 916 and stored in the output memory of main-frame 918. It is noted that the further division of the subset of input data need not be divided in the same ratio as the original division.

Figure 10:
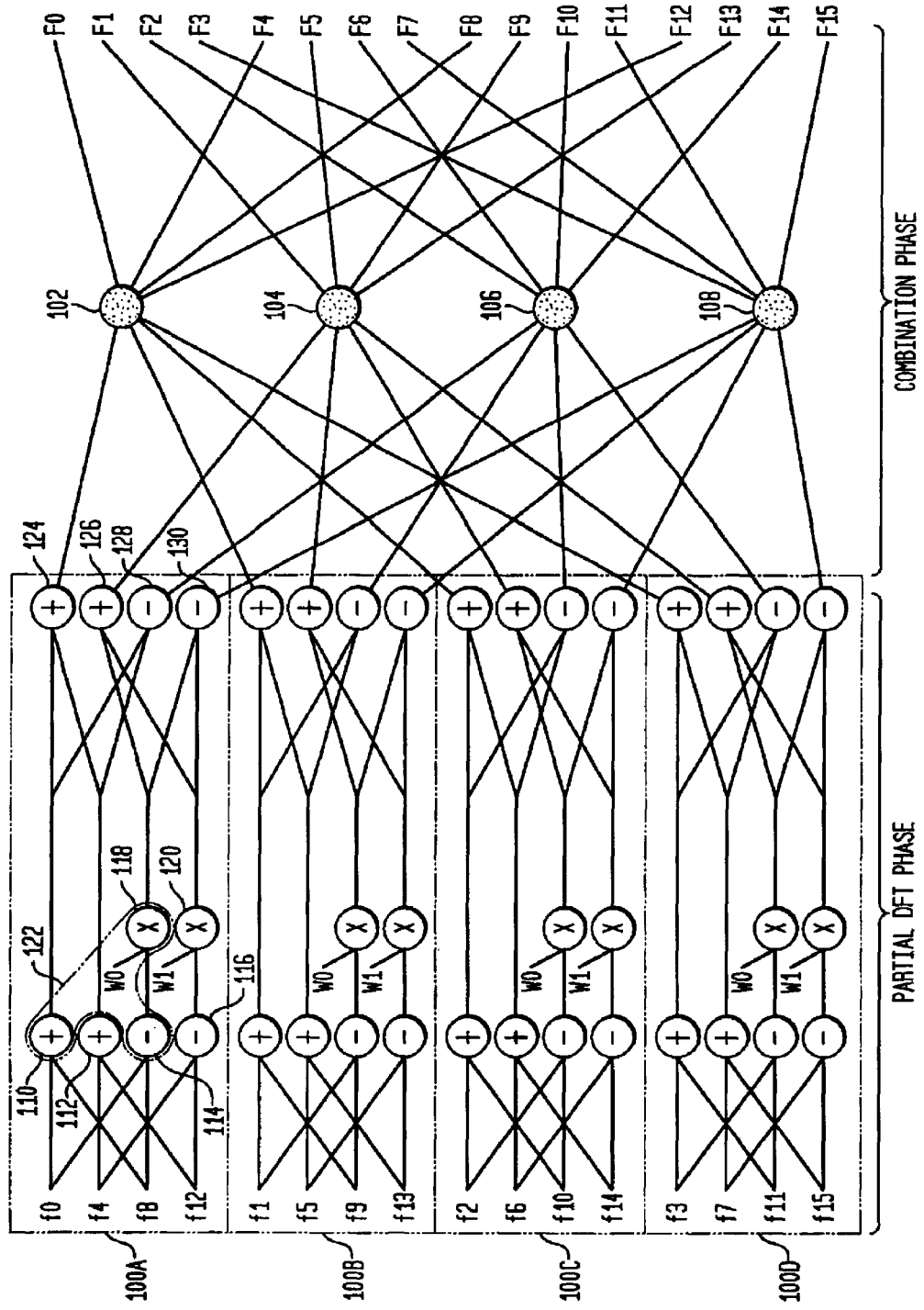
FIG. 10 is a block diagram of a 16-point radix-2 embodiment of a parallel FFT multiprocessor in accordance with the present invention using four 4-point parallel processors.

A specific embodiment of a 16-point radix-2 DFT utilizing the parallel processing architecture of the present invention is shown in FIG. 10. Four separate and independent parallel processors 100A, 100B, 100C, 100D are responsive to the input data points. Parallel processor 100A comprises adders 110, 112, 114, 116, 124, 126, 128, 130, and multipliers 118, 120. Adders 110, 114 and multiplier 118 form a radix-2 butterfly 122. The outputs of the four parallel processors are combined using four radix-4 butterflies 102, 104, 106, 108 to form the output data points.

An alternate embodiment of a 16-point radix-2 DFT utilizing the parallel processing architecture of the present invention is shown in FIG. 11. Two separate and independent parallel processors 150A, 150B are responsive to the input data points. Parallel processor 150A comprises a plurality of adders and multipliers. In particular, adders 152, 154 and multiplier 156 form a radix-2 butterfly. Similarly, adders 162, 164 and multiplier 166 form a radix-2 butterfly. The outputs of the two parallel processors 150A, 150B are combined using eight radix-2 butterflies formed by adders 170 and multipliers 172 to form the output data points.

THE JABER PRODUCT (*): Representing the DFT in Terms of Its Partial DFTs

For a given r×r square matrix $T_r$ and for a given set of r column vectors of length $X_{0_{(k)}}, X_{1_{(k)}}, \ldots, X_{(r-1)_{(k)}}$, the Jaber product is defined as the operator * as the following operation:

$$T_r * \begin{bmatrix} X_{0_{(k)}} \\ X_{1_{(k)}} \\ \ldots \\ X_{(r-1)_{(k)}} \end{bmatrix} = \begin{bmatrix} X_{0_{(0)}}T_{00} + X_{1_{(0)}}T_{01} + \ldots + X_{(r-1)_{(0)}}T_{0(r-1)} \\ X_{0_{(1)}}T_{00} + X_{1_{(1)}}T_{01} + \ldots + X_{(r-1)_{(1)}}T_{0(r-1)} \\ \ldots \\ X_{0_{(\beta-1)}}T_{00} + \ldots + X_{(r-1)_{(\beta-1)}}T_{0(r-1)} \\ X_{0_{(0)}}T_{10} + X_{1_{(0)}}T_{11} + \ldots + X_{(r-1)_{(0)}}T_{1(r-1)} \\ \ldots \\ X_{0_{(\beta-1)}}T_{10} + \ldots + X_{(r-1)_{(\beta-1)}}T_{1(r-1)} \\ \ldots \\ X_{0_{(0)}}T_{(r-1)0} + \ldots + X_{(r-1)_{(0)}}T_{(r-1)(r-1)} \\ \ldots \\ X_{0_{(\beta-1)}}T_{(r-1)0} + \ldots + X_{(r-1)_{(\beta-1)}}T_{(r-1)(r-1)} \end{bmatrix}, \quad (12)$$

which is equal to:

$$T_r * \begin{bmatrix} X_{0_{(k)}} \\ X_{1_{(k)}} \\ \ldots \\ X_{(r-1)_{(k)}} \end{bmatrix} = \begin{bmatrix} X_{0_{(0)}}T_{00} + \ldots + X_{(r-1)_{(k)}}T_{0(r-1)} \\ X_{0_{(1)}}T_{10} + \ldots + X_{(r-1)_{(k)}}T_{1(r-1)} \\ \ldots \\ X_{0_{(k)}}T_{(r-1)0} + \ldots + X_{(r-1)_{(k)}}T_{(r-1)(r-1)} \end{bmatrix} \text{for} \quad (13)$$

$k = 0, 1, \ldots, \beta - 1.,$

For simplicity the definition of Jaber product expressed in above two equations could be represented as:

$$T_r * [X_{m_{(k)}}] = \left[\sum_{m=0}^{r-1} X_{m_{(k)}} T_{(l,m)}\right] \text{for } k = 0, 1, \ldots, \beta - 1 \text{ and} \quad (14)$$

$l = 0, 1, \ldots, r - 1.$

Mathematical representation of the DFT in terms of its partial DFTs. The operation of a radix r butterfly PE is defined by:

$X=B_r x x$                               (15), where $x=[x_0, x_1, \ldots, x_{r-1}]^T$ is the input vector and $X=[X_0, X_1, \ldots, X_{r-1}]^T$ is the output vector, $B_r$ is the r×r butterfly matrix, which can be expressed as:

$$B_r = w_{(r,k,i)} \times T_r = [B_{r\_DIF\ (l,m)(k,i)}] \quad (16)$$

with $$B_{r-DIF(l,m)(k,i)} = w^{((lmN/r + \tilde{N}(k/r^i))lr^i))_N} \quad (17),$$

for the decimation in frequency process, and $$B_r = T_r \times w_{(r,k,i)} = [B_{r\_DIT(l,m)(k,i)}] \quad (18).$$

in which $$B_{r\_DIT(l,m)(k,1)} = w^{((lmN/r + \tilde{N}(k/r^{(n-1)})m_r^{(n-i)}))_N} \quad (19),$$

for the decimation in time process. $((x))_N$ denotes x modulo N, $\tilde{N}(k/r^i)$ is defined as the integer part of the division of k and $r^i$ and $w_{(r,k,i)}$ represents the twiddle factor matrix expressed by:

$$W_{(r,k,i)} = \begin{bmatrix} w_{(0,k,i)} & 0 & - & 0 \\ 0 & w_{(1,k,i)} & - & 0 \\ - & - & - & - \\ 0 & 0 & - & w_{((r-1),k,i)} \end{bmatrix} = [w_{(l,m)(k,i)}], \quad (20)$$

with $w_{(l,m)(k,i)} = w^{((\tilde{N}(\frac{k}{r^i})lr^i))_N}, \quad (21)$ for l=m, and 0 elsewhere, for the decimation in frequency process and $$w_{(l,m)(k,i)} = w^{((\tilde{N}(k/r^{(n-i)})m_r^{(n-1)}))_N} \quad (22),$$

for l=m, and 0 elsewhere, for the decimation in time process. $T_r$ is an r×r matrix representing the adder-tree in the butterfly, where $$T_r = \begin{bmatrix} w^0 & w^0 & w^0 & - & w^0 \\ w^0 & w^{N/r} & w^{2N/r} & - & w^{(r-1)N/r} \\ w^0 & w^{2N/r} & w^{4N/r} & - & w^{2(r-1)N/r} \\ - & - & - & - & - \\ w^0 & w^{(r-1)N/r} & - & - & w^{(r-1)^2N/r} \end{bmatrix} = [T_{(l,m)}], \quad (23)$$

where $T_{(l,m)} = w^{((lm\frac{N}{r}))_N}, \quad (24)$ for l=m=0, ..., r−1.

Based on the proposition in the previous section, equation 1 may be rewritten as:

$$X_{(k)} = \sum_{n=0}^{N-1} x_{(n)} w_N^{kn} = T_r \hat{*} \begin{bmatrix} \sum_{n=0}^{(N/r)-1} x_{(m)} w_N^{mk} \\ \sum_{n=0}^{(N/r)-1} x_{(m+1)} w_N^{(m+1)k} \\ \ldots \\ \sum_{n=0}^{(N/r)-1} x_{(m+r-1)} w_N^{(m+r-1)k} \end{bmatrix}, \quad (25)$$

for k=0, 1, ..., (N/r)−1, and n=0, 1, ..., N−1.
Since, $$w_N^{mk} = w_{N/r}^{nk} \quad (26),$$

equation (25) becomes:

$$X_{(k)} = T_r \hat{*} \begin{bmatrix} \sum_{n=0}^{(N/r)-1} x_{(m)} w_{N/r}^{nk} \\ \sum_{n=0}^{(N/r)-1} x_{(m+1)} w_{N/r}^{nk} w_N^{k} \\ \ldots \\ \sum_{n=0}^{(N/r)-1} x_{(m+(r-1))} w_{N/r}^{nk} w_N^{(r-1)k} \end{bmatrix} \quad (27)$$

$$= T_r \hat{*} \begin{bmatrix} \sum_{n=0}^{(N/r)-1} x_{(m)} w_{N/r}^{nk} \\ w_N^k \sum_{n=0}^{(N/r)-1} x_{(m+1)} w_{N/r}^{nk} \\ \ldots \\ w_N^{(r-1)k} \sum_{n=0}^{(N/r)-1} x_{(m+(r-1))} w_{N/r}^{nk} \end{bmatrix},$$

which for simplicity may be expressed as:

$$X_{(k)} = T_r \hat{*} \left[ w_N^{j_1 k} \sum_{n=0}^{(N/r)-1} x_{(m+j_1)} w_{N/r}^{nk} \right], \quad (28)$$

where for simplification in notation the column vector in equation 27 is set equal to:

$$\begin{bmatrix} \sum_{n=0}^{(N/r)-1} x_{(m)} w_{N/r}^{nk} \\ w_N^k \sum_{n=0}^{(N/r)-1} x_{(m+1)} w_{N/r}^{nk} \\ \ldots \\ w_N^{(r-1)k} \sum_{n=0}^{(N/r)-1} x_{(m+(r-1))} w_{N/r}^{nk} \end{bmatrix} = \left[ w_N^{j_1 k} \sum_{n=0}^{(N/r)-1} x_{(m+j_1)} w_{N/r}^{nk} \right] \text{ for} \quad (29)$$

$$j_1 = 0, \ldots, (r-1).$$

If $X_{(k)} = \sum_{n=0}^{N-1} x_{(n)} w_N^{nk}$ represents the DFT of a sequence of length N, $$X_{p0_{(k)}} = \sum_{n=0}^{(N/r)-1} x_m w_{N/r}^{nk}, X_{p1_{(k)}}$$

$$= \sum_{n=0}^{(N/r)-1} x_{m+1} w_{N/r}^{nk}, \ldots, X_{p(r-1)_{(k)}}$$

$$= \sum_{n=0}^{(N/r)-1} x_{m+(r-1)} w_{N/r}^{nk}$$

represent the DFT of sequences of length N/r. As a result, equation (28) can be expressed as:

$$X_{(k)} = T_r \hat{*} \begin{bmatrix} w^0 X_{p0_{(k)}} \\ w_N^k X_{p1_{(k)}} \\ \ldots \\ w_N^{(r-1)k} X_{p(r-1)_{(k)}} \end{bmatrix} = T_r \hat{*} \left[ w_N^{j_1 k} X_{pj_{1(k)}} \right], \quad (30)$$

for $j_1=0, 1, \ldots, r-1$.

Finally equation (30) can be developed according to the definition of Jaber product to yield the following expression:

$$X_{(k)} = \begin{bmatrix} w^0 X_{p0_{(k)}} + w^{0+k} X_{p1_{(k)}} + \ldots + w^{0+(r-1)k} X_{p(r-1)_{(k)}} \\ w^0 X_{p0_{(k)}} + w^{N/r+k} X_{p1_{(k)}} + \ldots + w^{(r-1)N/r+(r-1)k} X_{p(r-1)_{(k)}} \\ \ldots \\ w^0 X_{p0_{(k)}} + \ldots + w^{(r-1)^2 N/r+(r-1)k} X_{p(r-1)_{(k)}} \end{bmatrix} \quad (31)$$

for k=0,1, ..., β−1.
Due to the fact that:

$$X_{(k)} = T_r \hat{*} \left[ \begin{bmatrix} w_N^0 & 0 & - & 0 \\ 0 & w_N^k & - & 0 \\ - & - & - & - \\ 0 & 0 & - & w_N^{(r-1)k} \end{bmatrix} \times \begin{bmatrix} X_{p0_{(k)}} \\ X_{p1_{(k)}} \\ - \\ X_{p(r-1)_{(k)}} \end{bmatrix} \right] \quad (32)$$

$$= [T_r \times W_{(k)}] \hat{*} [X_{pj_{1(k)}}],$$

where $w_{(k)} = [w_{(l,j_1)}]$ (33)

in which $w_{(l,j_1)} = w^{((jk))_N}$ (34), for $l=j_1$ and 0 elsewhere, equation 30 in case where $X_{pj_{1(k)}}$ represents the partial DIF or DIT DFT of the sequence $$\sum_{n=0}^{(N/r)-1} x_{(m+j_1)} w_{N/r}^{nk}$$

may be expressed by:

$$X_{(k)} = [B_{r(Combination\ DIT)}] \hat{*} [X_{pj_{1(k)}}] \quad (35),$$

for the decimation in time process, and $$X_{(k)} = [B_{r(Combination\ DIF)}] \hat{*} [X_{pj_{1(k)}}] \quad (36),$$

where $X_{pj_{1(k)}}$ represents the partial DIT or DIF DFT of the sequence $$\sum_{n=0}^{(N/r)-1} x_{(m+j_1)} w_{N/r}^{nk}.$$

Further simplification results when the $l^{th}$ transform of the $k^{th}$ word is represented by:

$$X_{l_{(k)}} = \sum_{j_1=0}^{r-1} X_{pj_{1(k)}} w_N^{((l_jN/r+j_1k))_N} \quad (37)$$

for l=0, 1, ..., r−1, k=0, 1, ..., β−1, where $((x))_N$ denotes x modulo N. The $l^{th}$ transform is stored at the address memory location given by equation (4).

Parallel Multiprocessing Algorithm—FIG. 8

The conceptual key of parallel processing is in the reformulation of the Discrete Fourier Transform in terms of its partials DFTs that can be combined in a single combination phase. The present reformulation enables the design of a multiprocessor parallel structure that utilizes r-processing elements in parallel to implement each of the partial DFT computations. For a multiprocessor environment, the parallel processor implementation results in a decrease in time-delay for the complete FFT of O(r). The time delay could be decreased by a factor of $O(r^2)$ by implementing the butterflies with BPEs as described in the appendix hereto, which butterfly computing elements utilizes r complex multipliers in parallel to implement each of the butterfly computations.

A second aspect of the combined parallel multiprocessor and BPE in the appendix is that that the combination is especially adapted for parallel multiprocessing environments. If each butterfly is implemented using the disclosed PBE, each of the r parallel processors would always be executing the same instruction simultaneously, which is very desirable for implementation.

The Bit Reversed Input Ordered Output Parallel Multiprocessing Algorithm

The data are fed into the memory blocks of each processing element on level (layer) 1 by the address generator given in equation (21) $S_{1j_1} = x_{(r_n^j + j_1)}$ for $j_1=0, 1, \ldots, r-1$ and $n=0, 1, \ldots, ((N/r)-1)$.

By denoting $X_{p0_{(k)}}, X_{p1_{(k)}}, \ldots, X_{p(r-1)_{(k)}}$ as the partial DIF or DIT DFTs of $$\sum_{n=0}^{(N/r)-1} x_m w_{N/r}^{nk}, \sum_{n=0}^{(N/r)-1} x_{m+1} w_{N/r}^{nk}, \ldots \text{ and } \sum_{n=0}^{(N/r)-1} x_{m+(r-1)} w_{N/r}^{nk}$$

respectively, words of length r are fed into the input of the parallel multiprocessing processing element (MPE). The writing address generator $w_r$ stores the $l^{th}$ MPE's output $X_{l_{(k)}}$ of the $k^{th}$ word, generated by equation (37) above into the input memory of level (layer) 0 at the address location:

$$W_r = l(N/r) + k \quad (39),$$

for k=0, 1, ..., $(N/r^2)-1$.

Multistage Parallel Multiprocessing—FIG. 9

Further decomposition of the data in terms of its partial DFTs leads to a multistage parallel multiprocessing as shown in FIG. 9. This type of implementation is feasible for applications in which a huge amount of data needs to be processed and where rapidity, precision and better resolution are required.

By adopting the following notation:

$$X_{(k)} = T_{r_0} \hat{*} \begin{bmatrix} T_{r_{r_0}} \hat{*} \left[ w_N^{r_{r_0} j_{r_0} k} \sum_{n=0}^{(N/r_0 r_{r_0})-1} x_{(r_0(r_{r_0} n + j_{r_0}))} w_{N/r_0 r_{r_0}}^{nk} \right] \\ \ldots \\ w_N^{(r_0-1)k} T_{r_{(r_0-1)}} \hat{*} \\ \left[ w_N^{r_{(r_0-1)} j_{r_{(r_0-1)}} k} \sum_{n=0}^{(N/r_0 r_{(r_0-1)})-1} x_{(r_0(r_{(r_0-1)} n + j_{r_{(r_0-1)}}) + (r_0-1))} w_{N/r_0 r_{(r_0-1)}}^{nk} \right] \end{bmatrix}, \quad (40)$$

which may be represented for simplification in notation by:

$$= T_{r_0} \hat{*} \left[ w_N^{jr_0 k} T_{r_{r_{j0}}} \hat{*} \right. \tag{41}$$

$$\left. \left[ w_N^{r_{j0} jr_{r_{j0}} k} \left[ \sum_{n=0}^{(N/r_0 r_{r_{j0}})-1} x_{\left(\left(r_{r_{j0}} n + j r_{r_{j0}}\right) + j r_0\right)} w_{N/r_0 r_{r_{j0}}}^{nk} \right] \right] \right],$$

$$= T_{r_0} \hat{*} \left[ w_N^{jr_0 k} T_{r_{r_{j0}}} \hat{*} \right. \tag{42}$$

$$\left. \left[ w_{N/r_{r_{j0}}}^{jr_{r_{j0}} k} \left[ \sum_{n=0}^{(N/r_0 r_{r_{j0}})-1} x_{\left(r\left(r_{r_{j0}} n + j r_{r_{j0}}\right) + j r_0\right)} w_{N/r_0 r_{r_{j0}}}^{nk} \right] \right] \right],$$

for $j_{r_0} = 0, 1, \ldots, r_0-1$, and $j_{r_{r_{j0}}} = 0, 1, \ldots, r_{(r_{j0})} - 1$.

In general the radix r FFT expressed in terms of its $i^{th}$ partial FFTs will be as follow:

$$X_{(k)} = T_r \hat{*} \left[ w_N^{j_1 k} T_r \hat{*} \left[ w_{N/r}^{j_2 k} \ldots T_r \hat{*} \right. \right. \tag{43}$$

$$\left. \left. \left[ w_{N/r^{(i-1)}}^{j_i k} \left[ \sum_{n=0}^{(N/r^i)-1} x_{\left(r^i n + r^{(i-1)} j_1 + \ldots + r^0 j_i\right)} w_{N/r^i}^{nk} \right] \right] \ldots \right] \right],$$

for $j_1 = \ldots = j_i = 0, 1, \ldots, r-1$ and $i = 1, \ldots, p$.

The conceptual key of multistage parallel processing is the formulation of the radix-r FFT as composed of partial FFTs with identical structures and a systematic means of accessing the same multipliers coefficients. The latter architecture enables the design of a multi-layer processing element (MPE), in which each layer utilizes an r-processing element (PE) in parallel to implement each partial DFT computation. In other words, the multi-layer process acts as if the one-dimensional transform is expressed by a true $r^i$-dimensional transform, which is feasible in neural networks computing.

The Radix r Multistage Parallel Multiprocessing Algorithm $X_{(K)}$, elements of layer 0 are obtained by combining the r−1 subsets of layer one. Each subset of layer one is obtained by combining r−1 subsets of layer 2 (see tree model of FIG. 7). For the layer i, which contains $r^i$ PE implemented in parallel with r complex multipliers implemented in parallel as shown in FIG. 9, $(N/r^i)$ elements of data are fed into the memory blocks of each processing element by the address generator given in equation (10) $x_{ij_1 \ldots j_i} = x_{(r^i n + r^{(i-1)} j_i + r^{(i-2)} j_{(1-2)} + \ldots + r^0 j_1)}$,
for $j_1 = \ldots = j_i = 0, 1, \ldots, r-1$.

At this level, $r^i$ partials FFTs are performed in parallel in absence of any communication between these parallel processing elements (i.e., are independent of each other) and where they will execute the same instruction simultaneously.

By denoting $X_{ij_1 \ldots ji_{(0)}}, X_{ij_0} \ldots j_{1_{(1)}}, \ldots, X_{ij_0} \ldots j_{i_{(r-1)}}$ the DIT or DIF partials FFTs of the subsets on level i, therefore the subsets on level (layer) i−1 are obtained by:

$$X_{(i-1)j_1 \ldots j_{(i-1)(k)}} = T_r \hat{*} \left[ w_{N/r^{(i-1)}}^{j_i j k} X_{ij_0 \ldots j_{i_{(k)}}} \right] \tag{44}$$

$$= T_r \hat{*} \left[ w_N^{r^{(i-1)} j_i k} X_{ij_0 \ldots j_{i_{(k)}}} \right],$$

$$X_{(i-1)j_1 \ldots j_{(i-1)(k)}} = T_r \hat{*} \left[ \begin{bmatrix} w_N^0 & 0 & - & 0 \\ 0 & w_N^{(i-1)k} & - & 0 \\ - & - & - & - \\ 0 & - & - & w_N^{(i-1)(r-1)k} \end{bmatrix} \times \right. \tag{45}$$

$$\left. \begin{bmatrix} X_{ij_1 \ldots j_{i_{(0)}}} \\ X_{ij_1 \ldots j_{i_{(1)}}} \\ - \\ X_{ij_1 \ldots j_{i_{(r-1)}}} \end{bmatrix} \right],$$

$$X_{(i-1)j_1 \ldots j_{(i-1)(k)}} = [T_r \times w_{(k,i)}] * [X_{ij_1 \ldots j_{i_{(k)}}}] \tag{46},$$

where $W_{(k,i)} = [w_{(l,j_i)}]$ (47), in which $w_{(l,j_i)} = w_N^{((r^{(i-1)} j_i k))_N}$ (48)

for $l = j_i$ and 0 elsewhere, and finally $X_{(i-1)j_1 \ldots j_{(i-1)(k)}} = [B_r \text{ Combination}] * [X_{ij_1 \ldots j_{i_{(k)}}}]$ (49), for $j_0 = 0, j_1 = \ldots = j_i = 0, 1, \ldots, r-1 i = p, p-1, \ldots, 1$ and $l = 0, 1, \ldots, r-1$. Further simplification could results when the $l^{th}$ transform of the $k^{th}$ word at the $i^{th}$ stage is represented by:

$$X_{(i-1)j_1 \ldots j_{(i-1)(l,k,i)}} = \sum_{j_i=0}^{r-1} X_{ij_1 \ldots j_{i_{(k,i)}}} w_N^{((j_i N/r + r^{(i-1)} j_i k))_N}, \tag{50}$$

and the $l^{th}$ *output of the* $k^{th}$ word at the $i^{th}$ stage will be stored into the memory block of its specific PE of the layer $j_{(i-1)}$ at the address location given by:

$$X_{(i-1)j_1 \ldots j_{(i-1)(l,k,i)}} = l\left(\frac{N}{r^i}\right) + k, \tag{51}$$

for $k = 0, 1, \ldots, (N/r^{(i+1)})-1$.

The subdivision of the input data continues till a radix r core calculation is obtained, which will generate a radix r FFT algorithm.

APPENDIX

Preferred Radix-r Butterfly-processing Element (BPE)

Any radix-r butterfly may be used with the present parallel multiprocessing architecture. However the preferred radix-r butterfly is assembled from a plurality of butterfly processing elements (BPEs). Each BPE, or engine, has a regular structure that can be utilized in an array of butterfly-processing elements (BPEs) each having substantially identical structure.

Mathematical Basis of the Butterfly Implementation

A mathematical term that is a function of r input points and provides a single output point is the basis for the design of the present BPE. To provide the insight forming the basis of the present BPE, the basic DFT equation is factored to group the variables used in multiplication (and simultaneously accessed from memory) into one matrix. In particular, starting from the basic DFT equations, the adder matrix is combined with the twiddle matrix to form a single phase of calculation. By grouping all the multiply calculations into one calculation phase and all the addition calculations into the remaining calculation phases, the total number of calculations is reduced and the degree of parallelism is increased.

For a radix-r DIF butterfly, r identical BPEs are arranged in parallel. Each of the r identical BPEs are substantially identical to each other and are operated in parallel using the same instructions and accessing the necessary set of multiplier coefficients from memory at the same time. The outputs of the r identical BPEs form the DFT's r output points.

For a radix-r DIT butterfly, (r−1) identical BPEs are arranged in parallel. Each of the (r−1) identical BPEs is substantially identical to the others and operates in parallel using the same instructions and accessing the necessary set of multiplier constants from memory at the same time. The outputs of the (r−1) identical BPEs form the DFT as (r−1) of the r output points of the butterfly. The remaining output point ($X_0$) of the DFT is formed as the sum of the r input points.

Trivial multiplications encountered during the execution of particular butterflies may be avoided by simple checks on the coefficient addresses. Avoiding trivial multiplications reduces the computational load of particular butterflies.

An FFT implementation is composed of a plurality of radix-r butterflies with identical BPEs and a systematic addressing scheme for accessing the corresponding multiplier coefficients. Each radix-r butterfly utilizes the basic computing unit (BPE), with r (or r−1) complex multipliers in parallel to implement each of the butterfly computations' output. There is a simple mapping relationship from the three indices (FFT stage, radix-r butterfly, butterfly-processing element) to the addresses of the needed multiplier coefficients. The simple mapping from the three indices to the addresses of the necessary multiplier coefficients accommodates the complexity of higher order radix and mixed radix butterfly implementations of the DFT. In a multiprocessor environment, much of the calculations are performed in parallel to greatly increase processing speed.

By using the disclosed BPE in the implementation of the radix-r butterfly, an FFT implementation is achieved with a reduced number of calculations and a reduced number of stages of calculations. In addition, the amount of parallelism, both within the butterfly processing element (BPE) calculation phases and within the overall FFT algorithm butterfly stages permits the use of parallel processing to increase overall FFT calculation speed.

The basic operation of a radix-r butterfly PE is the so-called butterfly in which r inputs are combined to give the r outputs via the operation:

$$X = B_r \times x \quad (2A),$$

where $x = [x_{(0)}, x_{(1)}, \ldots, x_{(r-1)}]^T$ is the input vector and $X = [X_{(0)}, X_{(1)}, \ldots, X_{(r-1)}]^T$ is the output vector.

A special operator, $B_r$ is the r×r butterfly matrix, which can be expressed as $$B_r = w_N^r \times T_r \quad (3A)$$

for the decimation in frequency process, and $$B_r = T_r \times w_N^r \quad (4A)$$

for the decimation in time process.

$w_N^r = \text{diag}(1, w_N^P, w_N^{2P}, \ldots, w_N^{(r-1)P})$ represents the twiddle factor and $T_r$ is an r×r matrix representing the adder-tree in the butterfly, where $$T_r = \begin{bmatrix} w^0 & w^0 & w^0 & - & w^0 \\ w^0 & w^{N/r} & w^{2N/r} & - & w^{(r-1)N/r} \\ w^0 & w^{2N/r} & w^{4N/r} & - & w^{2(r-1)N/r} \\ - & - & - & - & - \\ w^0 & w^{(r-1)N/r} & - & - & w^{(r-1)2N/r} \end{bmatrix} = [T_{(l,m)}], \quad (5A)$$

where $$T_{(l,m)} = w^{((lm\frac{N}{r}))N}, \quad (6A)$$

l=m=0, . . . , r−1 and ((X))N=X modulo N.

A higher radix butterfly will decrease the number of multiplications and the number of butterfly stages, which is the motivation for to implement a higher radix butterfly. Since the higher radix reduces the communication load by reducing the number of stages, the remaining problem is reduction of the computational burden. Factoring the adder matrix Tr (radix 4 case) yielding to the following expression reduces the computational load $$T_4 = \begin{bmatrix} 1 & 1 & 1 & 1 \\ 1 & -j & -1 & j \\ 1 & -1 & 1 & -1 \\ 1 & j & -1 & -j \end{bmatrix} \quad (7A)$$

$$= \begin{bmatrix} 1 & 0 & 1 & 0 \\ 0 & 1 & 0 & -j \\ 1 & 0 & -1 & 0 \\ 0 & 1 & 0 & j \end{bmatrix} \times \begin{bmatrix} 1 & 0 & 1 & 0 \\ 1 & 0 & -1 & 0 \\ 0 & 1 & 0 & 1 \\ 0 & 1 & 0 & -1 \end{bmatrix}.$$

As a result, there is a reduction of 4 complex additions for the radix-4 butterfly. For the radix-8 butterfly, there is a reduction of 32 complex additions, 4 real additions and 4 real multiplications. The reduction of calculations is due to the detection of trivial multiplications (i.e., by 1 or −1) and by incorporating (absorbing) the multiplications by j or −j in the addition operation by switching the real and imaginary parts of the data. As indicated, factoring the adder matrix reduces the number of required computations. Although the computation burden is reduced, the complexity of the implementation of such butterflies will increase for higher radices. Also, for higher radices, the number of non-trivial multiplications increases.

An important observation is that both the adder matrix $T_r$ and the twiddle matrix $w_N^r$, contain twiddle factors. To control the variation of the twiddle factor during the calculation of a complete FFT, the twiddle factors and the adder matrix are incorporated in a single-phase of calculation.

The special operator $B_r$ is defined according to equation (3A), where $B_r$ is the product of the twiddle factor matrix $w_N^r$ and the adder matrix $T_r$.

So, by defining $w_{(r,k,i)}$ the set of the twiddle factor matrices $w_N^r$ as:

$$w_{(r,k,i)} = \begin{bmatrix} w_{(0,k,i)} & 0 & - & 0 \\ 0 & w_{(1,k,i)} & - & 0 \\ - & - & - & - \\ 0 & 0 & - & w_{((r-1),k,i)} \end{bmatrix} = [w_{(l,m)(k,i)}], \quad (8A)$$

in which, $$w_{(l,m)_{(k,i)}} = w^{((\tilde{N}(\frac{k}{r^i})lr^i))N} \text{ for } l = m, \text{ and 0 elsewhere,} \quad (9A)$$

therefore, the radix-r computation $B_{r\_DIF}$ will be expressed:

$$B_{r\_DIF} = w_{(r,k,i)} \times T_r = [B_{r\_DIF(l,m)_{(k,i)}}] \quad (10A),$$

$$\text{with } B_{r\_DIF(l,m)_{(k,1)}} = w^{((lmN/r+\tilde{N}k/r^i)lr^i))N} \quad (11A),$$

l=m=0, ..., r−1, i=0,1, ..., n−1, k=0,1, (N/r)−1, $((X))_N$ denotes x modulo N and $\tilde{N}(k/r^i)$ is defined as the integer part of the division of k and $r^i$.

As a result, the operation of a radix-r PE for the DIF FFT will formulated by:

$$\text{the colon vector } X_{(r,k,i)} = B_{r\_DIF} \times x = [X_{(l)_{(k,i)}}] \quad (12A),$$

where the $l^{th}$ output $$X_{(l)_{(k,i)}} = \sum_{m=0}^{r-1} x_{(m)} w^{((lmN/r+\tilde{N}(k/r^i)lr^i))N}, \quad (13A)$$

Using the same reasoning as for the radix-r DIF FFT above, the operation of a radix-r DIT FFT is derived below. In accordance with equation (4A), $B_r$ is the product of the adder matrix $T_r$ and the twiddle factor matrix $w_N^r$, which is equal to:

$$B_{r\_DIT} = T_r \times w_{(r,k,i)} = [B_{r\_DIT(l,m)_{(k,i)}}] \quad (14A),$$

$$\text{in which } B_{r\_DIT(l,m)_{(k,1)}} = w^{((l\ m\ N/r+\tilde{N}(k/r^{(n-1)})mr^{(n-1)}))N} \quad (15A),$$

and $$W_{(r,k,i)} = \begin{bmatrix} w_{(0,k,i)} & 0 & - & 0 \\ 0 & w_{(1,k,i)} & - & 0 \\ - & - & - & - \\ 0 & 0 & - & w_{((r-1),k,i)} \end{bmatrix} = [w_{(l,m)_{(k,i)}}], \quad (16A)$$

where $$w_{(l,m)_{(k,i)}} = w^{\tilde{N}(k/r^{(n-1)})mr^{(n-i)})N} \text{ for } l=m, \text{ and 0 elsewhere} \quad (17A)$$

and n=(log N/log r)−1.

As a result, the operation of a radix-r PE for the DIT FFT will be:

$$\text{the colon vector } X_{(r,k,i)} = B_{r\_DIT} \times x = [X_{(l)_{(k,i)}}] \quad (18A),$$

where the $l^{th}$ output $$X_{(l)_{(k,i)}} = \sum_{m=0}^{r-1} x_{(m)} w^{((lmN/r+\tilde{N}(k/r^{(n-i)})mr^{(n-i)}))N}. \quad (19A)$$

Radix-r Butterfly for an FFT Algorithm

The conceptual key to forming an FFT algorithm is building radix-r FFT butterflies composed of BPEs having identical structures and a systematic means of accessing the corresponding multiplier coefficients stored in memory. The present approach reduces the number of required multipliers and adders.

Each butterfly-processing element utilizes either r complex multipliers in parallel (for a DIF implementation) or (r−1) complex multipliers in parallel (for a DIT implementation) to implement each of the butterfly computations. There is a simple mapping from the three indices (FFT stage, butterfly, processing element) to the addresses of the multiplier coefficients needed in FIGS. 3A and 4A.

Figure 3A:
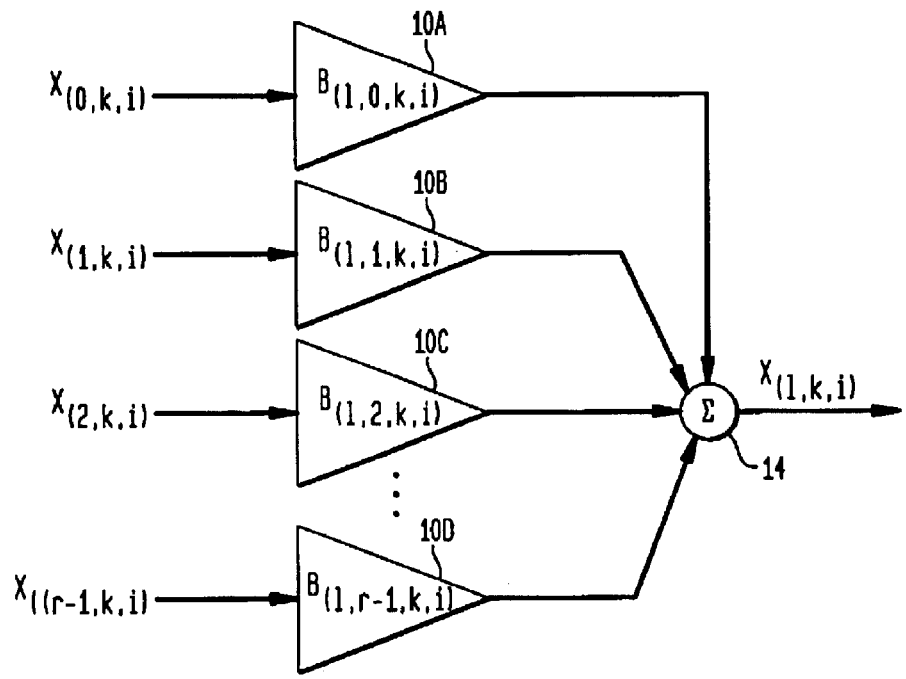
FIG. 3A is a schematic diagram of a DIF butterfly-processing element for an FFT algorithm for use with the present invention.
Figure 3B:
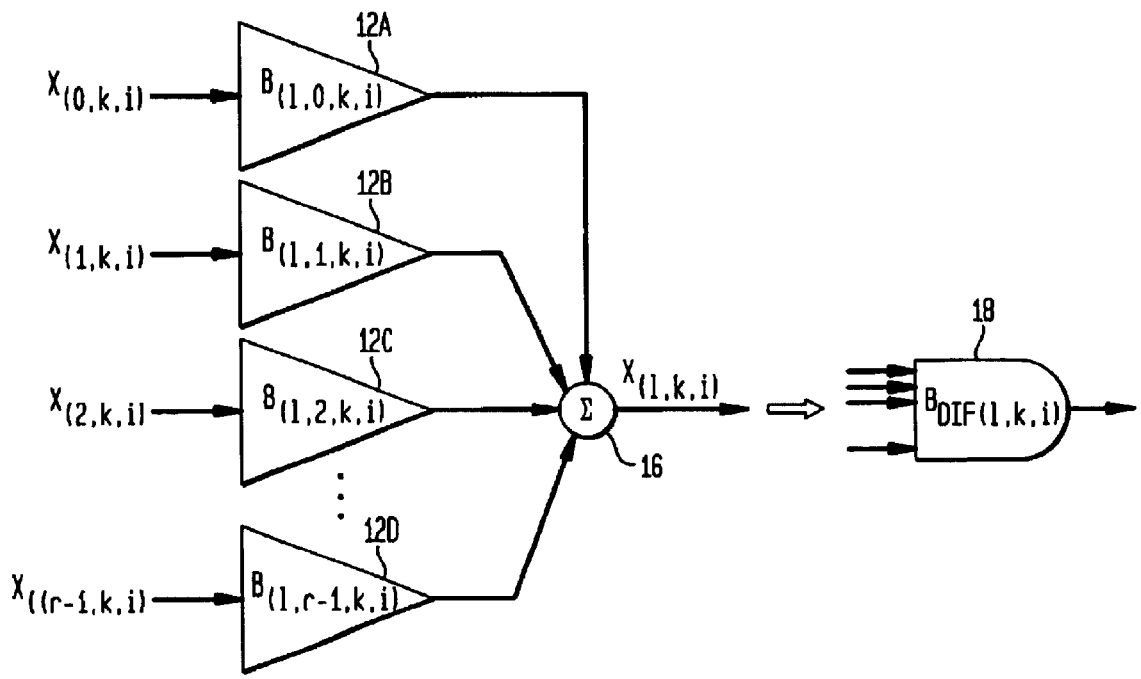
FIG. 3B is a shorthand representation of a DIF butterfly-processing element for use with the present invention.

FIGS. 3A and 3B illustrate a DIF BPE for an FFT. A plurality of r complex multipliers 10A, 10B, 10C, 10D and an adder 14 are provided. One input of each multiplier 10A, 10B, 10C, 10D is coupled to each respective input data point of the input sequence, x. The outputs of each multiplier, 10A, 10B, 10C and 10D are coupled to the inputs of adder 14. The output of adder 14 is coupled to one of the output data points of the output sequence, X. As shown in FIG. 3B, a generalized butterfly-processing element 12A, 12B, 12C, 12D and 16 is represented by the specialized operator, $B_{r\_DIF}$.

Figure 4A:
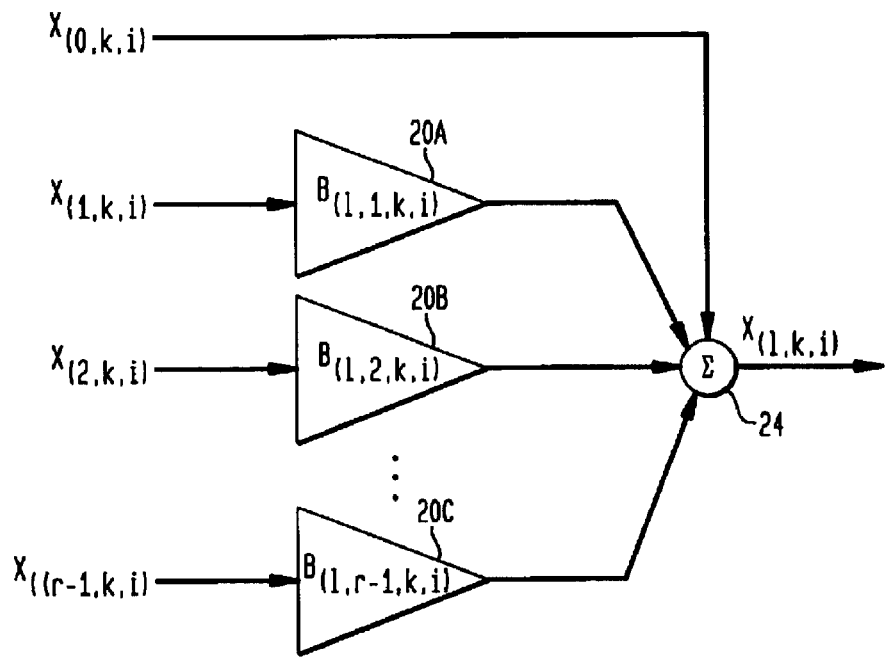
FIG. 4A is a schematic diagram of a DIT butterfly-processing element for an FFT algorithm for use with the present invention.
Figure 4B:
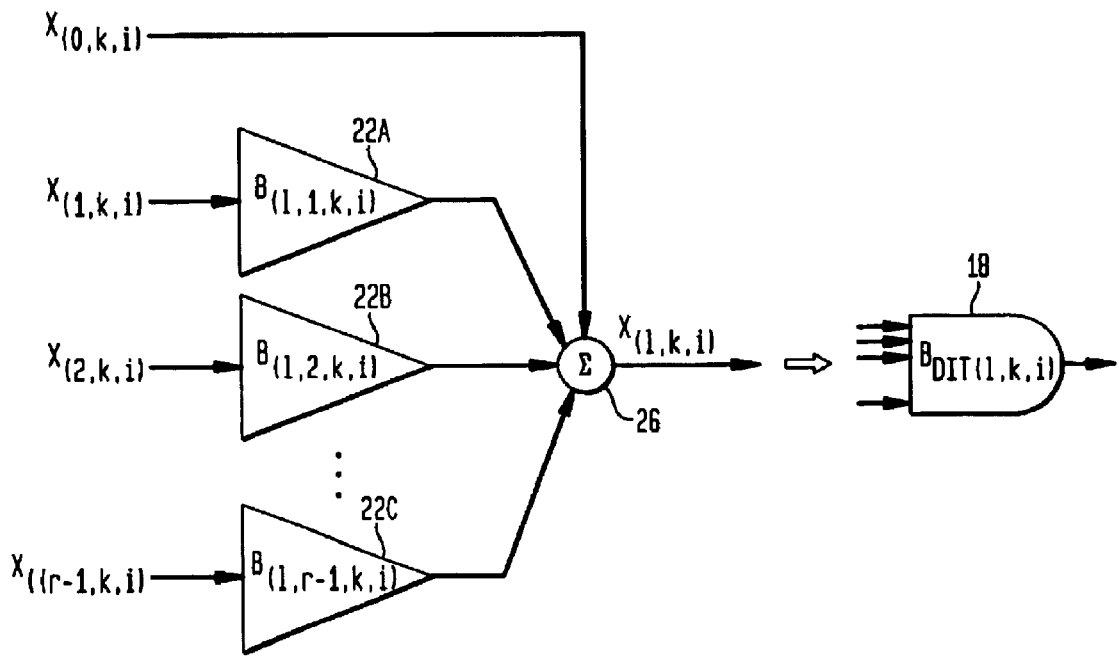
FIG. 4B is a shorthand representation of a DIT butterfly-processing element for use with the present invention.

FIGS. 4A and 4B illustrate a DIT butterfly-processing element (BPE) for an FFT. A plurality of r complex multipliers 20A, 20B, 20C, and an adder 24 are provided. One input of each multiplier 20A, 20B, 20C, is coupled to each respective input data point of the input sequence, x. The outputs of each multiplier, 20A, 20B and 20C are coupled to the inputs of adder 24. The output of adder 24 is coupled to one of the output data points of the output sequence, X. As shown in FIG. 4B, the specialized operator, $B_{r\_DIT}$, represents a generalized butterfly-processing element 22A, 22B, 22C and 26.

Figure 5A:
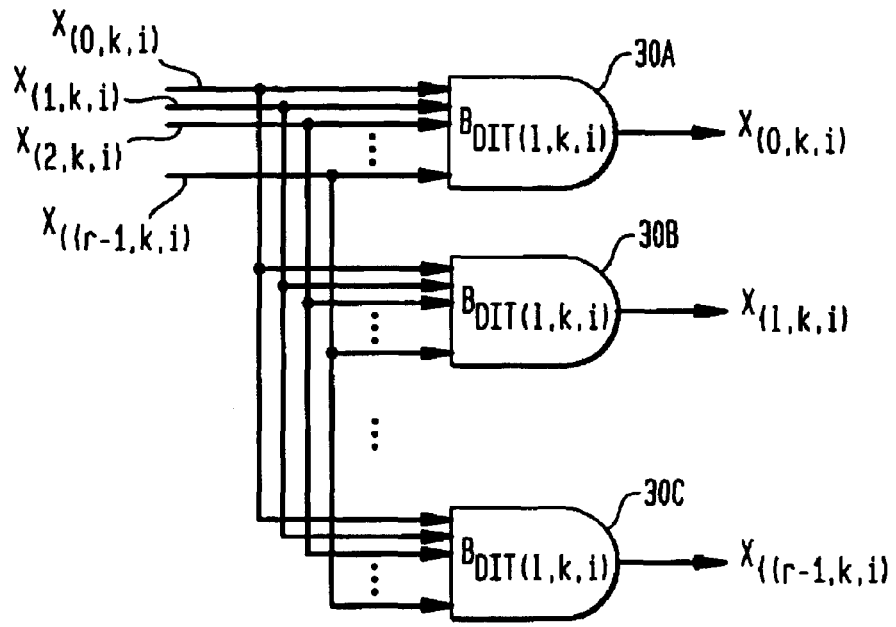
FIG. 5A is a schematic representation of a DIF butterfly for use with the present invention.
Figure 5B:
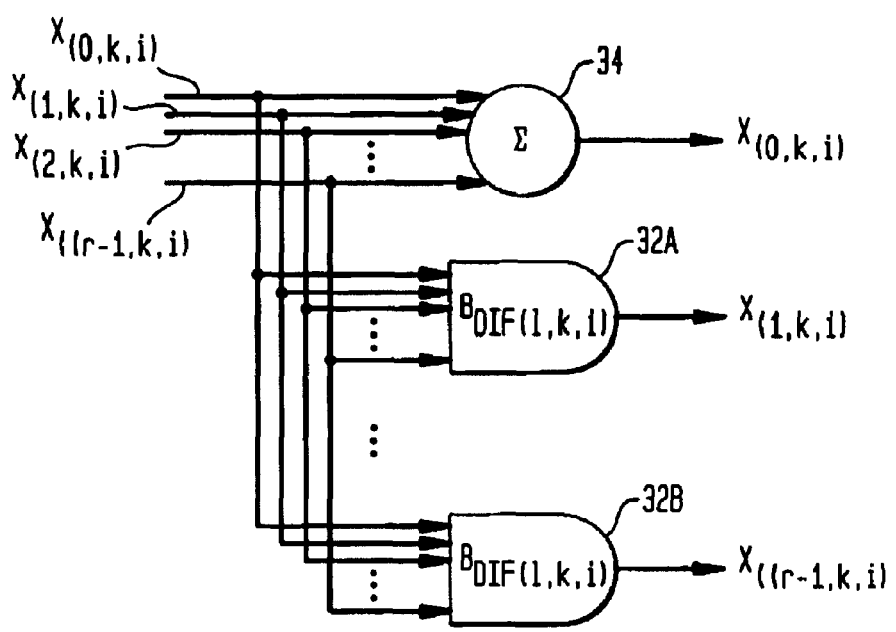
FIG. 5B is a schematic representation of a DIT butterfly for use with the present invention.

FIGS. 5A and 5B illustrate how each of the butterfly-processing elements (BPEs) represented by the specialized operators, $B_{DIF}$ and $B_{DIT}$ are arranged to form DIF and DIT butterflies respectively. In particular, FIG. 5A illustrates a DIF radix-r butterfly. In FIG. 5A, r butterfly-processing elements 30A, 30B, 30C are arranged in parallel. The inputs of each of the r BPEs 30A, 30B, 30C are respectively coupled to each respective input data point of the input sequence, x. The outputs of each of the r BPEs 30A, 30B, 30C are respectively coupled to each respective output data point of the output sequence, X. Each of the butterfly-processing elements (BPEs) 30A, 30B, 30C, which are operated in parallel, are substantially identical as shown in FIG. 4B.

FIG. 5B illustrates a radix-r DIT butterfly. In FIG. 5B, r−1 butterfly-processing elements 32A, 32B are arranged in parallel. The inputs of each of the r−1 BPEs 32A, 32B are respectively coupled to each respective input data point of the input sequence, x. The outputs of each of the r−1 BPEs 32A, 32B are respectively coupled to each respective output data point of the output sequence, X, except for $X_0$. Each of the BPEs 32A, 32B, which are operated in parallel, is substantially identical to the others as shown in FIG. 3B. Furthermore, an adder 34 is provided to generate the lower order output data point, $X_0$. The r input terminals of adder 34 are respectively coupled to each respective input data point of the input sequence, x. The output of adder 34 is coupled to the lower order output data point, $X_0$.

As shown in FIGS. 5A and 5B, the present radix-r FFT butterfly is composed of parallel computing elements. During the FFT calculation, the simultaneous execution of r butterflies in parallel on r separate processors is feasible during each FFT stage. Each the r parallel processors would always be executing the same instruction simultaneously, which is very desirable for implementation on some of the latest DSP cards. Trivial multiplications encountered during the execution of a particular butterflies (specific radices) may be avoided by simple checks on the coefficients addresses. Avoiding trivial multiplications reduces the computational load of particular butterflies. Trivial multiplications could also be controlled by hardware implementation by using a complex multiplier bypass for p=0, where the trivial multiplication could be computed by two simple multipliers.

Reduction in computation can be achieved, by controlling the trivial multiplication in each word when $((lmN/r+\tilde{N}(k/r^1)lr^i))_N$ or $((lmN/r^{(n-i)}+\tilde{N}(k/r^{(n-i)}) mr\ r^i))_N$ are equal to a multiple of N/r. As a result, the most significant advantage is that the multiplication by j and −j will be absorbed, yielding to a huge reduction in shifting and negating processes, and the only trivial multiplication left is the multiplication by 1 or −1. In this case the multiplier is by passed whenever the operators $\beta_{(i)}$ satisfies the condition of being a multiple N/r.

Figure 6A:
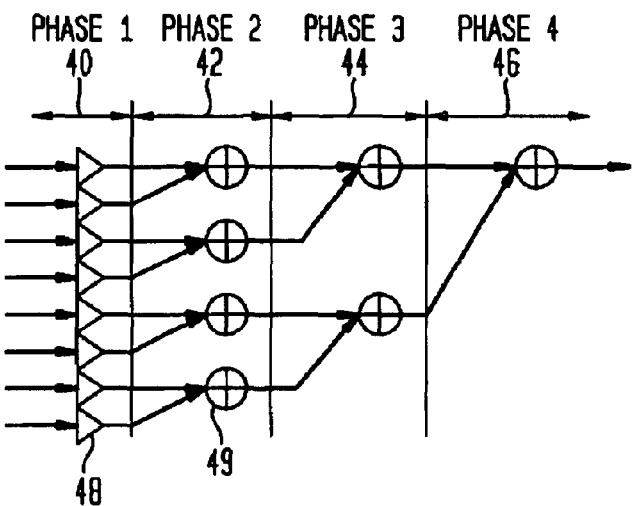
FIG. 6A is a schematic representation of a radix-8 DIT butterfly-processing element for use with the present invention.
Figure 6B:
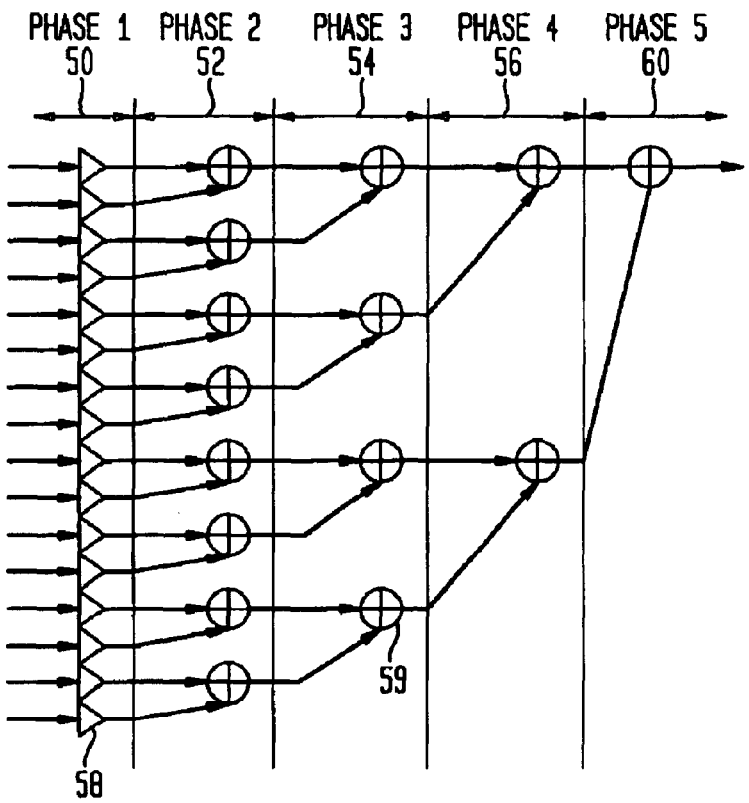
FIG. 6B is a schematic representation of a radix-16 DIF butterfly-processing element for use with the present invention.

FIGS. 6A and 6B illustrate the regular internal structure of the present radix-r butterfly-processing element (BPE). A radix-8 DIT butterfly-processing element illustrated in FIG. 6A includes a plurality of 7 (r−1=7, where r=8) multipliers 48 and adders 49. The multipliers 48 correspond to the (r−1) multipliers 20A, 20B, 20C in FIG. 4A, and the adders 49 correspond to adder 24 in FIG. 4A. To compute each output data point, there are 4 phases of computation. In the first phase 40, multipliers 48 multiply each input data point by a coefficient retrieved from memory. Note that all of the coefficients required by multipliers 48 are retrieved within phase 1. In the next three phases 42, 44, 46, the outputs of the multipliers 48 are summed in adders 49, in pairs. That is, in the second phase 42, four pair of multiplier 48 outputs are added together. In the third phase 44 two pair of adder outputs from the second phase 42 are added together. In the fourth phase 46, one pair of adder outputs from the third phase 44 are added together to form a single output data point.

A radix-16 DIF butterfly-processing element illustrated in FIG. 6B includes a plurality of 16 multipliers 58 and adders 59. The 16 multipliers 58 correspond to the r multipliers 10A, 10B, 10C, 10D in FIG. 3A and the adders 59 correspond to adder 24 in FIG. 3A. To compute each output data point, there are 5 phases of computation. In the first phase 50, multipliers 58 multiply each input data point by a coefficient retrieved from memory. Note that all of the coefficients required by multipliers 58 are retrieved within phase 1. In the next four phases 52, 54, 56, 60, the outputs of the multipliers 58 are summed in adders 59, in pairs. That is, in the second phase 52, eight pair of multiplier 58 outputs are added together. In the third phase 54 four pair of adder outputs from the second phase 52 are added together. In the fourth phase 56, two pair of adder outputs from the third phase 54 are added together. In the fifth phase 60, one pair of adder outputs from the fourth phase 56 are added together to form a single output data point.

As can be seen from FIGS. 6A and 6B, multipliers 48, 58 may be implemented with parallel computing elements because the multiplications are occurring simultaneously in a single phase. Also, due to the regular structure of the DIT and DIF butterfly-processing elements, an increase in radix, is accommodated by an increase in the number of additional addition phases.

Thus, in applications where minimizing the overall FFT processing time is the most important factor, such as in real time signal processing applications, a parallel implementation of the radix-r butterfly is beneficial.

What is claimed is:

1. A Fourier transform processor responsive to N input data points to compute N data output points, said Fourier transform processor comprising:

a plurality of r parallel processing elements, each of said plurality of r parallel processing elements having N/r input data points and N/r output data points, said N/r input data points of said plurality of r parallel processors being coupled to respective ones of said N input data points, each of said plurality of r parallel processing elements being independent of each other and having at least two stages of butterfly computing elements; and a combination phase computing element having N output points forming said N data output data points of said Fourier transform processor, said combination phase computing element having N input data points coupled to respective ones of said N/r output data points from said plurality of r processing elements, said combination phase computing element including a single stage of butterfly computing elements, wherein each of said r parallel processing elements includes a butterfly processing element for use in a decimation in frequency radix-r butterfly responsive to a plurality of input data points, said radix-r butterfly providing a plurality of output a points, said butterfly processing element comprising:

a plurality of multipliers, each of said multipliers having a respective first and second input terminals and a respective output terminal; and an adder having a plurality of input terminals and an output terminal, each of said plurality of input terminals of said adder being coupled to a respective on of said output terminals of said plurality of multipliers;

said plurality of first input terminals of said plurality of multiple each being respectively coupled to one of said plurality of input data points, said output terminal of said adder being coupled to one of said plurality of output data points said plurality of second input terminals of said plurality of multipliers being coupled to a set of coefficients derived from the product of an adder matrix $T_r$ and a twiddle factor matrix $w_N^r$ wherein said coefficients derived from the product of said adder matrix $T_r$ and said twiddle factor matrix $w_N^r$, are substantially given by $$T_r = \begin{bmatrix} w^0 & w^0 & w^0 & - & w^0 \\ w^0 & w^{N/r} & w^{2N/r} & - & w^{(r-1)N/r} \\ w^0 & w^{2N/r} & w^{4N/r} & - & w^{2(r-1)N/r} \\ - & - & - & - & - \\ w^0 & w^{(r-1)N/r} & - & - & w^{(r-1)^2 N/r} \end{bmatrix} = [T_{(l,m)}], \quad (5A)$$

where $$T_{(l,m)} = w^{((lm\frac{N}{r}))_N}, \quad (6A)$$

and defining $w_{(r,\ k,\ i)}$ the set of the twiddle factor matrices $w_N^r$ as:

$$W_{(r,k,i)} = \begin{bmatrix} w_{(0,k,i)} & 0 & - & 0 \\ 0 & w_{(1,k,i)} & - & 0 \\ - & - & - & - \\ 0 & 0 & - & w_{((r-1),k,i)} \end{bmatrix} = [w_{(l,m)_{(k,i)}}], \quad (8A)$$

in which, $$w_{(l,m)_{(k,i)}} = w^{((\tilde{N}(\frac{k}{r^i})lr^i))N} \text{ for } 1 = m, \text{ and 0 elsewhere,} \quad (9A)$$

wherein, $$B_{r\,DIF} = w_{(r,k,i)} \times T_r = [B_{r\,DIF(l,m)_{(k,i)}}] \quad (10A),$$

$$\text{with } B_{r\,DIF(l,m)_{(k,i)}} = w^{((lmN/r + \tilde{N}(k/r^i)/r^i))N} \quad (11A),$$

l=m=0, ..., r−1, i=0,1 ..., n−1, k=0,1 ...,1 (N/r)−1, $((x))_N$ denotes x modulo N and $\tilde{N}$ (k/r$^i$) is defined as the integer part of the division of k and r$^i$, whereby the operation of said butterfly processing element for said decimation in frequency radix-r butterfly is:

the colon vector $X_{(r,k,i)} = B_{r\,DIF} \times x = [X_{(l)_{(k,i)}}]$ (12A), where the 1$^{th}$ output $$X_{(l)_{(k,i)}} = \sum_{m=0}^{r-1} x_{(m)} w^{((lmN/r + \tilde{N}(k/r^i)lr^i))N}. \quad (13A)$$

2. A Fourier transform processor responsive to N input data points to compute N data output points, said Fourier transform processor comprising:
a plurality of r parallel processing elements, each of said plurality of r parallel processing elements having N/r input data points and N/r output data points, said N/r input data points of said plurality of r parallel processors being coupled to respective ones of said N input data points, each of said plurality of r parallel processing elements being independent of each other and having at least two stages of butterfly computing elements; and
a combination phase computing element having N output points forming said N data output data points of said Fourier transform processor, said combination p se computing element having N input data points coupled to respective ones of said N/r output data points from said plurality of r processing elements, said combination phase computing element including a single stage of butterfly computing elements,
wherein each of said r parallel processing elements includes a butterfly processing element for use in a decimation in time radix-r butterfly responsive to plurality of r input data points, said radix-r butterfly providing a plurality of output data points, said butterfly processing element comprising:
a plurality of r-1 multipliers, each of said r-1 multipliers having a respective first and second input terminals and a respective output terminal; and
an adder having a plurality of r input terminals and an output terminal, one of said plurality of r input terminals of said adder being coupled to a first input cia a point of said plurality of r input data points, each of the r-1 others of said plurality of r input terminals of said adder being coupled to a respective one of said output terminals of said plurality of r-1 multipliers;
said r-1 plurality of first input terminals of said r-1 plurality of multipliers each being respectively coupled to one of r-1 of said plurality of r input data point, said output terminal of said adder being coupled to one of said plurality of output data points; and
said plurality of second input terminals of said r-1 plurality of multipliers being coupled to a set of coefficients derived from the product of an adder matrix $T_r$ and twiddle factor matrix $w_N^r$,
wherein said coefficients derived from the product of said adder matrix $T_r$ and said twiddle factor matrix $w_N^r$, are substantially given by, $$B_{r\,DIT} = T_r \times w_{(r,k,i)} = [B_{r\,DIT(l,m)_{(k,1)}}] \quad (14A),$$

in which $B_{r\,DIT(l,m)_{(k,i)}} = w^{((lmN/r + \tilde{N}(k/r^{(n-1)})mr^{(n-i)}))N}$ (15A), and $$W_{(r,k,i)} = \begin{bmatrix} w_{(0,k,i)} & 0 & - & 0 \\ 0 & w_{(1,k,i)} & - & 0 \\ - & - & - & - \\ 0 & 0 & - & w_{((r-1),k,i)} \end{bmatrix} = [w_{(l,m)_{(k,i)}}], \quad (16A)$$

where $w_{(l,m)_{(k,i)}} = w^{\tilde{N}(k/r^{(n-i)})mr^{(n-i)})N}$ for 1=m, and 0 elsewhere (17A), and n=(log N/log r)−1, whereby the operation of said butterfly processing element for said decimation in time radix-r butterfly is:

the colon vector $X_{(r,k,i)} = B_{r\,DIT} \times x = [X_{(l)_{(k,i)}}]$ (18A), where the 1$^{th}$ output $$X_{(l)_{(k,i)}} = \sum_{m=0}^{r-1} x_{(m)} w^{((lmN/r + \tilde{N}(k/r^{(n-i)})mr^{(n-i)}))N}. \quad (19A)$$

3. A Fourier transform processor responsive to N input data points to compute N data output points, said Fourier transform processor comprising:
a plurality of r parallel processing elements, each of said plurality of r parallel processing elements having N/r input data points and N/r output data points, said /r input data points of said plurality of r parallel processors being coupled to respective nes of said N input data points, each of said plurality of r parallel processing elements being independent of each other and having at least two stages of butterfly computing elements; and
a combination phase computing element having N output points forming said N data output data points of said Fourier transform processor, said combination phase computing element having N input data points coupled to respective ones of said N/r output data points from said plurality of r processing elements, said combination phase computing element including a single stage of butterfly computing elements,
wherein each of said r parallel processing elements includes a radix-r butterfly responsive to a plurality of input data points and having a plurality of calculation phases, said radix-r butterfly further providing a plurality of output data points, said radix-r butterfly comprising:
a first plurality of multipliers; and
a second plurality of adders, wherein
said first plurality of multipliers operate substantially simultaneously during a given calculation phase of said plurality of calculation phases, and said second plurality of adders operate during said plurality of calculation phases other than said given calculation phase, wherein said plurality of multipliers are coupled to a set of coefficients derived from the product of an adder matrix $T_r$ and a twiddle factor matrix $w_N^r$ wherein said coefficients derived from the product of said adder matrix $T_r$ and said twiddle factor matrix $w_N^r$, are substantially given by $$T_r = \begin{bmatrix} w^0 & w^0 & w^0 & - & w^0 \\ w^0 & w^{N/r} & w^{2N/r} & - & w^{(r-1)N/r} \\ w^0 & w^{2N/r} & w^{4N/r} & - & w^{2(r-1)N/r} \\ - & - & - & - & - \\ w^0 & w^{(r-1)N/r} & - & - & w^{(r-1)^2 N/r} \end{bmatrix} = [T_{(l,m)}], \quad (5A)$$

where $$T_{(l,m)} = w^{((lm\frac{N}{r}))_N}, \quad (6A)$$

and defining $w_{(r, k, i)}$ the set of the twiddle factor matrices $w_N^r$ as:

$$W_{(r,k,i)} = \begin{bmatrix} w_{(0,k,i)} & 0 & - & 0 \\ 0 & w_{(1,k,i)} & - & 0 \\ - & - & - & - \\ 0 & 0 & - & w_{((r-1),k,i)} \end{bmatrix} = [w_{(l,m)(k,i)}], \quad (8A)$$

in which, $$w_{(l,m)(k,i)} = w^{((\tilde{N}(\frac{k}{r^i})lr^i))_N} \text{ for } 1 = m, \text{ and } 0 \text{ elsewhere,} \quad (9A)$$

wherein, $$B_{r\_DIF} = w_{(r,k,i)} \times T_r = [B_{r\_DIF(l,m)(k,i)}] \quad (10A),$$

with $B_{r\_DIF(l,m)(k,i)} = w^{((lmN/r + \tilde{N}k/r^i)1r^i))_N} \quad (11A),$ 1=m=0, ..., r-1, i=0,1 ..., n-1, k=0,1 ..., (N/r)-1, $((x))_N$ denotes x modulo N and $\tilde{N}(k/r^i)$ is defined as the integer part of the division of k and $r^i$, whereby the operation of said butterfly processing element for said decimation in frequency radix-r butterfly is:

the colon vector $X_{(r,k,i)} = B_{r\_DIF} \times x = [X_{(l)(k,i)}] \quad (12A),$ where the $1^{th}$ output $$X_{(l)(k,i)} = \sum_{m=0}^{r-1} x_{(m)} w^{((lmN/r + \tilde{N}(k/r^i)lr^i))_N}. \quad (13A)$$

4. A Fourier transform processor responsive to N input data points to compute N data output points, said Fourier transform processor comprising:

a plurality of r parallel processing elements, each of said plurality of r parallel processing elements having N/r input data points and N/r output data points, said /r input data points of said plurality of r parallel processors being coupled to respective nes of said N input data points, each of said plurality of r parallel processing elements being independent of each other and having at least two stages of butterfly computing elements; and a combination phase computing element having N output points forming said N data output data points of said Fourier transform processor, said combination phase computing element having N input data points coupled to respective ones of said r output data points from said plurality of r processing elements, said combination phase computing element including a single stage of butterfly computing elements, wherein each of said r parallel processing elements includes a radix-r butterfly responsive to a plurality of input data points and having a plurality of calculation phases, said radix-r butterfly further providing a plurality of output data points, said radix-r butterfly comprising:

a first plurality of multipliers; and a second plurality of adders, wherein said first plurality of multipliers operate substantially simultaneously ring a given calculation phase of said plurality of calculation phases, and said second plurality of adders operate during said plurality of calculation phases other than said given calculation phase, wherein said plurality of multipliers are coupled to a set of coefficients derived from the product of an adder matrix $T_r$ and a twiddle factor matrix $w_N^r$ wherein said coefficients derived from the product of said adder matrix $T_r$ and said twiddle factor matrix $w_N^r$, are substantially given by, $$B_{r\_DIT} = T_r \times w_{(r,k,i)} = [B_{r\_DIT(l,m)(k,i)}] \quad (14A),$$

in which $B_{r\_DIT(l,m)(k,i)} = w^{((lmN/r + \tilde{N}(k/r^{(n-i)})mr^{(n-i)}))_N} \quad (15A)$ and $$W_{(r,k,i)} = \begin{bmatrix} w_{(0,k,i)} & 0 & - & 0 \\ 0 & w_{(1,k,i)} & - & 0 \\ - & - & - & - \\ 0 & 0 & - & w_{((r-1),k,i)} \end{bmatrix} = [w_{(l,m)(k,i)}], \quad (16A)$$

where $w_{(l,m)(k,i)} = w^{\tilde{N}(k/r^{(n-i)})mr^{(n-1)}))_N}$ for 1=m, and 0 elsewhere (17A), and n=(log N/log r)-1, whereby the operation of said butterfly element for processing element for said decimation in time radix-r butterfly is:

the colon vector $X_{(r,k,i)} = B_{r\_DIT} \times x = [X_{(l)(k,i)}] \quad (18A),$ where the $1^{th}$ output $$X_{(l)(k,i)} = \sum_{m=0}^{r-1} x_{(m)} w^{((lmN/r + \tilde{N}(k/r^{(n-i)})mr^{(n-1)}))_N}. \quad (19A)$$

* * * * *